US008805288B2

United States Patent
Martin et al.

(10) Patent No.: US 8,805,288 B2
(45) Date of Patent: Aug. 12, 2014

(54) REPORTING AND USE OF USER EQUIPMENT MEASUREMENT EVENT CONFIDENCE LEVEL

(75) Inventors: Brian Martin, Surrey (GB); Alexander Graham Charles, Fleet (GB)

(73) Assignee: Nokia Corporation, Espoo (FI)

( * ) Notice: Subject to any disclaimer, the term of this patent is extended or adjusted under 35 U.S.C. 154(b) by 182 days.

(21) Appl. No.: 12/821,047

(22) Filed: Jun. 22, 2010

(65) Prior Publication Data

US 2010/0323631 A1    Dec. 23, 2010

Related U.S. Application Data

(60) Provisional application No. 61/269,220, filed on Jun. 22, 2009.

(51) Int. Cl.
*H04B 17/00* (2006.01)
*H04W 24/10* (2009.01)

(52) U.S. Cl.
CPC ........... *H04B 17/0067* (2013.01); *H04W 24/10* (2013.01)
USPC ...................................... 455/67.11; 455/63.1

(58) Field of Classification Search
CPC ........................... H04B 17/0067; H04W 24/10
USPC ......... 455/63.1, 63.2, 67.11, 435.1, 437, 522, 455/550.1, 561; 370/204, 205, 328, 342; 708/250
See application file for complete search history.

(56) References Cited

U.S. PATENT DOCUMENTS

| 2004/0021604 A1 | 2/2004 | Marinier |
| 2008/0153533 A1 | 6/2008 | Claussen et al. |
| 2009/0042595 A1 * | 2/2009 | Yavuz et al. .................. 455/522 |
| 2009/0061892 A1 | 3/2009 | Lee et al. |
| 2009/0117907 A1 | 5/2009 | Wigren |
| 2009/0264126 A1 * | 10/2009 | Khetawat et al. .......... 455/435.1 |
| 2010/0234028 A1 * | 9/2010 | Narasimha et al. ........... 455/437 |
| 2010/0242103 A1 * | 9/2010 | Richardson et al. ............. 726/7 |
| 2010/0279686 A1 * | 11/2010 | Tokgoz et al. ............. 455/435.1 |
| 2010/0285793 A1 * | 11/2010 | Yoon et al. ................. 455/422.1 |
| 2010/0323633 A1 * | 12/2010 | Pani et al. .................. 455/67.14 |
| 2010/0323663 A1 * | 12/2010 | Vikberg et al. ............... 455/410 |
| 2011/0171915 A1 * | 7/2011 | Gomes et al. ................... 455/73 |

FOREIGN PATENT DOCUMENTS

| WO | 2009022971 A1 | 2/2009 |
| WO | 2009022976 A1 | 2/2009 |
| WO | WO-2009/022971 A1 | 2/2009 |
| WO | WO-2009022976 A1 | 2/2009 |
| WO | 2009044317 A2 | 4/2009 |
| WO | 2009044318 A2 | 4/2009 |
| WO | WO-2009/044317 A2 | 4/2009 |
| WO | WO-2009/044318 A2 | 4/2009 |

OTHER PUBLICATIONS

Xie et al., "Facilitating Femtocell BS Detection with Location-Related Information", IEEE 802.16 Broadband Wireless Access Working Group, Apr. 24, 2009, pp. 1-3.

* cited by examiner

*Primary Examiner* — David Bilodeau
(74) *Attorney, Agent, or Firm* — Harrington & Smith

(57) ABSTRACT

In one exemplary embodiment of the invention, a method includes: detecting a local network access node; generating a measurement report based on the detected local network access node, where the measurement report is for transmission to a serving network access node; and in response to successfully reading system information for the detected local network access node, including in the generated measurement report information that uniquely identifies the detected local network access node.

16 Claims, 12 Drawing Sheets

REPORTING AND USE OF USER EQUIPMENT MEASUREMENT EVENT CONFIDENCE LEVEL

RELATED APPLICATION

This patent application claims priority under 35 U.S.C. §119(e) from U.S. Provisional Patent Application No. 61/269,220, filed Jun. 22, 2009, the disclosure of which is incorporated by reference herein in its entirety.

TECHNICAL FIELD

The exemplary and non-limiting embodiments of this invention relate generally to wireless communication systems, methods, devices and computer programs and, more specifically, relate to closed subscriber group operation of a user equipment with a macro/serving network.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station
CGI cell global identifier
CM compressed mode
CSG closed subscriber group
DRX discontinuous reception
DTX discontinuous transmission
eNB E-UTRAN Node B (evolved Node B)
E-UTRAN evolved universal terrestrial radio access network (LTE)
GPS global positioning system
HO handover
IE information element
LTE long term evolution of UTRAN (E-UTRAN)
NCL neighbor cell list
Node B base station
PCI physical cell identifier
PSC primary scrambling code
RAT radio access technology
RRC radio resource control
SI system information
SIB system information block
UE user equipment, such as a mobile station, mobile node or mobile terminal
UMTS universal mobile telecommunications system
UTRAN universal terrestrial radio access network
WCDMA wideband code division multiple access CSG cells have restricted access and only permitted UEs can make use of them. CSG cells are expected to be deployed in an uncontrolled manner, which implies that they could be located anywhere and switched on or off at any time. In addition, a planned network (e.g., a macro network, such as a cellular network) is not required to include CSG cells in its neighbor cell lists.

One typical use case is that a home base station (e.g., a home Node B or home eNB) would enable a user to make and receive calls in their home with their mobile phone, but while using a broadband connection and not the cellular network. This may be expected to reduce calling costs without incurring the inconvenience of using a land line phone.

In 3GPP Release 9 (Rel-9) there is presently an ongoing work item for enhancements to mobility towards CSG cells. This work includes connected mode mobility enhancements. To improve the customer experience of using a home Node B cell it is desirable for a call initiated on the cellular network to be transferred to the CSG cell when the user enters his or her home or otherwise comes within range of the home Node B cell.

One aspect of the foregoing is accurate identification of the correct CSG cell for the UE to be handed over to. However, the detection and identification of the correct CSG cell is made more complicated when the UE is in the connected state (e.g., is involved in a voice call or is involved in a data connection).

SUMMARY

The below summary section is intended to be merely exemplary and non-limiting.

In one exemplary embodiment of the invention, a method comprising: detecting a local network access node; generating a measurement report based on the detected local network access node, where the measurement report is for transmission to a serving network access node; and in response to successfully reading system information for the detected local network access node, including in the generated measurement report information that uniquely identifies the detected local network access node.

In another exemplary embodiment of the invention, an apparatus comprising: means for detecting a local network access node; means for generating a measurement report based on the detected local network access node, where the measurement report is for transmission to a serving network access node; and means for, in response to successfully reading system information for the detected local network access node, including in the generated measurement report information that uniquely identifies the detected local network access node.

In a further exemplary embodiment of the invention, a method comprising: detecting a local network access node; generating a measurement report based on the detected local network access node; and in response to determining that a closed subscriber group (CSG) proximity indication for the detected local network access node has not been sent to a serving network access node, including a CSG proximity indication in the generated measurement report.

In another exemplary embodiment of the invention, an apparatus comprising: means for detecting a local network access node; means for generating a measurement report based on the detected local network access node; and means for, in response to determining that a closed subscriber group (CSG) proximity indication for the detected local network access node has not been sent to a serving network access node, including a CSG proximity indication in the generated measurement report.

In a further exemplary embodiment of the invention, a method comprising: detecting a local network access node; generating a measurement report based on the detected local network access node, where the measurement report is for transmission to a serving network access node; in response to determining that a closed subscriber group (CSG) proximity indication for the detected local network access node has not been sent to a serving network access node, including a CSG proximity indication in the generated measurement report; else: in response to successfully reading system information for the detected local network access node, setting a CSG identity information element in the generated measurement report to uniquely identify the detected local network access node by indicating a CSG identifier for the detected local network access node, in response to determining that the CSG identifier is in a CSG whitelist, setting a CSG Member indication information element in the generated measurement report to "member" in order to indicate that the CSG identifier for the detected local network access node is in the CSG whitelist, and in response to successfully or unsuccessfully reading the system information for the detected local network access node, including in the generated measurement report a primary scrambling code of the detected local network access node.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 1:
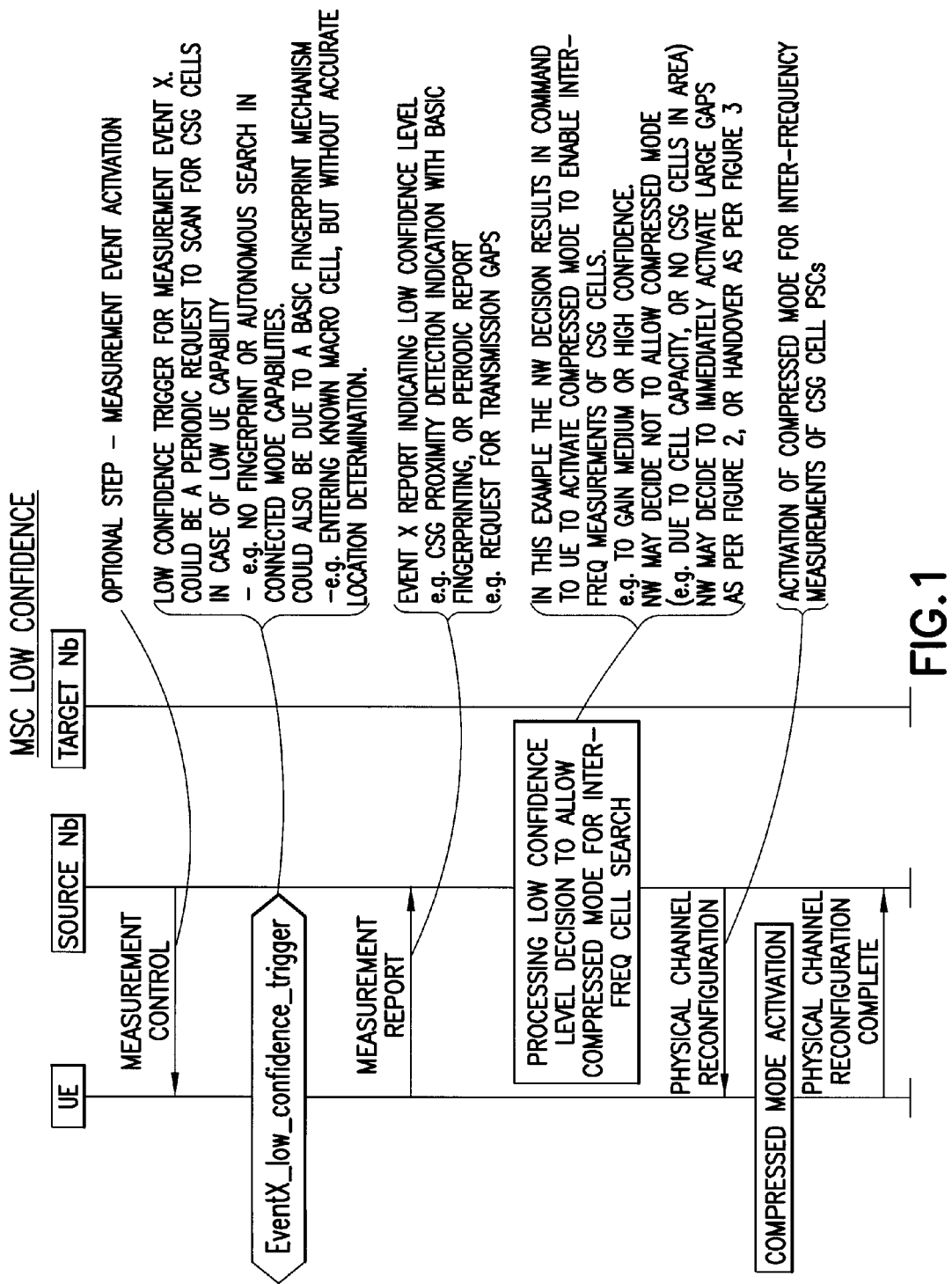
FIGS. 1, 2 and 3 are exemplary message/signal flow diagrams between a UE, a macro network BS and a CSG BS for a case of low confidence trigger, a medium confidence trigger and a high confidence trigger condition, respectively.

The exemplary embodiments of this invention relate to the deployment of closed subscriber group (CSG) cells in wireless communication networks, such as in UTRAN and E-UTRAN, as two non-limiting examples.

The exemplary embodiments of this invention provide methods, apparatus, computer programs and systems that provide a wireless communication network (e.g., one supporting an ongoing voice call or data connection) with a probability or confidence level (e.g., implied or explicit) that a correct home cell (e.g., home Node B) has been detected, in order to assist the network in making decisions of what actions to take, and to possibly minimize the need to activate unnecessary and cumbersome mobility procedures.

The exemplary embodiments of this invention may employ a UE internal measurement event (see FIG. 7 and the discussion thereof below) for CSG cell proximity detection to activate the detection and measurement of CSG cells, thus triggering the transfer of the call or data connection from the cellular network to the CSG cell. However, the exemplary embodiments of this invention may also be used as a stand-alone method where a CSG cell proximity event is not used. For example, a network may activate a compressed mode at all times for CSG searching, or a UE may request the compressed mode periodically.

The compressed mode is known from, for example, UMTS (WCDMA). During inter-frequency handover, the UE may need to be given time to make the necessary measurements on different WCDMA carrier frequencies. From 1 to 7 slots per frame may be allocated for the UE to perform these measurements. These slots can either be in the middle of a single frame or spread over two frames. The compressed mode operation can be achieved in three different ways:

a. by decreasing the spreading factor by 2:1, this increases the data rate such that bits are transmitted twice as fast;

b. by the use of puncturing bits, which removes various bits from the original data and thus reduces the amount of information that needs to be transmitted; or c. by changing higher layer scheduling to use fewer timeslots for user traffic.

General reference with regard to the compressed mode in UMTS can be made to 3GPP TS 25.212 V8.4.0 (2008-12) Technical Specification 3rd Generation Partnership Project; Technical Specification Group Radio Access Network; Multiplexing and channel coding (FDD) (Release 8), specifically section 4.4 "Compressed Mode", pages 52-56.

Various approaches have been discussed in 3GPP for how the UE may measure the PSC, CSG ID and CGI of the other cell during a gap in transmission, either by compressed mode, DRX/DTX, or during periods of tuning to another frequency, in order to resolve PSC/PCI confusion.

In general, the PSC/PCI confusion relates to a situation that can arise when two or more CSG cells are located within the same macro cell coverage area, and where the two or more CSG cells have the same PSC or the same PCI. In this case, methods for uniquely identifying the CSG cells have been discussed. A current assumption is that the LTE will somehow need to obtain the CSG ID and CGI/cell identity of the target cell. These methods, however, have certain disadvantages. For example, the presence of a long gap to receive system information can introduce delays in the handover procedure (from the macro cell to the CSG cell) and may possibly result in service interruption.

There is also currently an assumption that the UE may optionally have an implementation-dependent "fingerprint" method to assist in the search and detection of CSG cells. In 3GPP Rel-8 this may be used as an optimization of the UE autonomous search for CSG cells. In 3GPP Rel-9 this implementation-dependent method may be used to assist any connected mode solution for "PSC/PCI confusion resolution." The assumption that fingerprinting can be used to assist with CSG cell detection in the connected mode has been mentioned in 3GPP without, however, specifically mentioning any details of how the connected mode fingerprint method would be implemented.

An implementation-specific UE internal measurement event (one example is discussed below with reference to FIG. 7) may be used to indicate to the network that the UE is in the proximity of a CSG cell (by way of fingerprint or other methods), in the case that the compressed mode may be required, or where large gaps may be required to obtain system information.

Currently there is no method known to the inventors for the network to have knowledge of how accurate the UE fingerprint method is since the feature is not specified in any standard. It may be assumed that as more advanced methods become available, the accuracy of any UE implementation-specific methods will increase, thereby reducing/removing the need to perform any additional PSC/PCI confusion reduction/elimination mechanisms or any further measurements. Further, it may be assumed that any UE implementation-dependent mechanism may be more reliable under some circumstances than others, for example, if the UE relies on different information under different conditions.

Even without fingerprinting as such, those UEs with higher capabilities (e.g., UEs having a dual receiver architecture) may be able to perform inter-frequency measurements autonomously, and obtain system information autonomously, without the need to activate any newly-defined CSG procedures. Currently there is no method specified to enable higher capability UEs to perform in a more optimum fashion with respect to CSG handover evaluation, while allowing new procedures to be activated in the case of lower capability UEs. In general, some UEs may be able to perform inter-frequency measurements and obtain system information on some frequencies autonomously (e.g., for an adjacent channel) while not on others. Hence, under some circumstances the UE may be able to avoid the use of new procedures, while under other circumstances the UE may not be able to avoid the use of new procedures.

In general, any procedure that relies on a UE implementation-specific functionality (e.g., fingerprinting) has an unspecified accuracy.

Existing measurement reporting is based upon specified levels of accuracy (e.g., power level reporting within a specified tolerance) based on specified events. There are currently no measurement events or reports for which the UE can report different levels of accuracy or confidence in the trigger, for example, depending on the circumstances, available information and capabilities of the UE.

Figure 4:
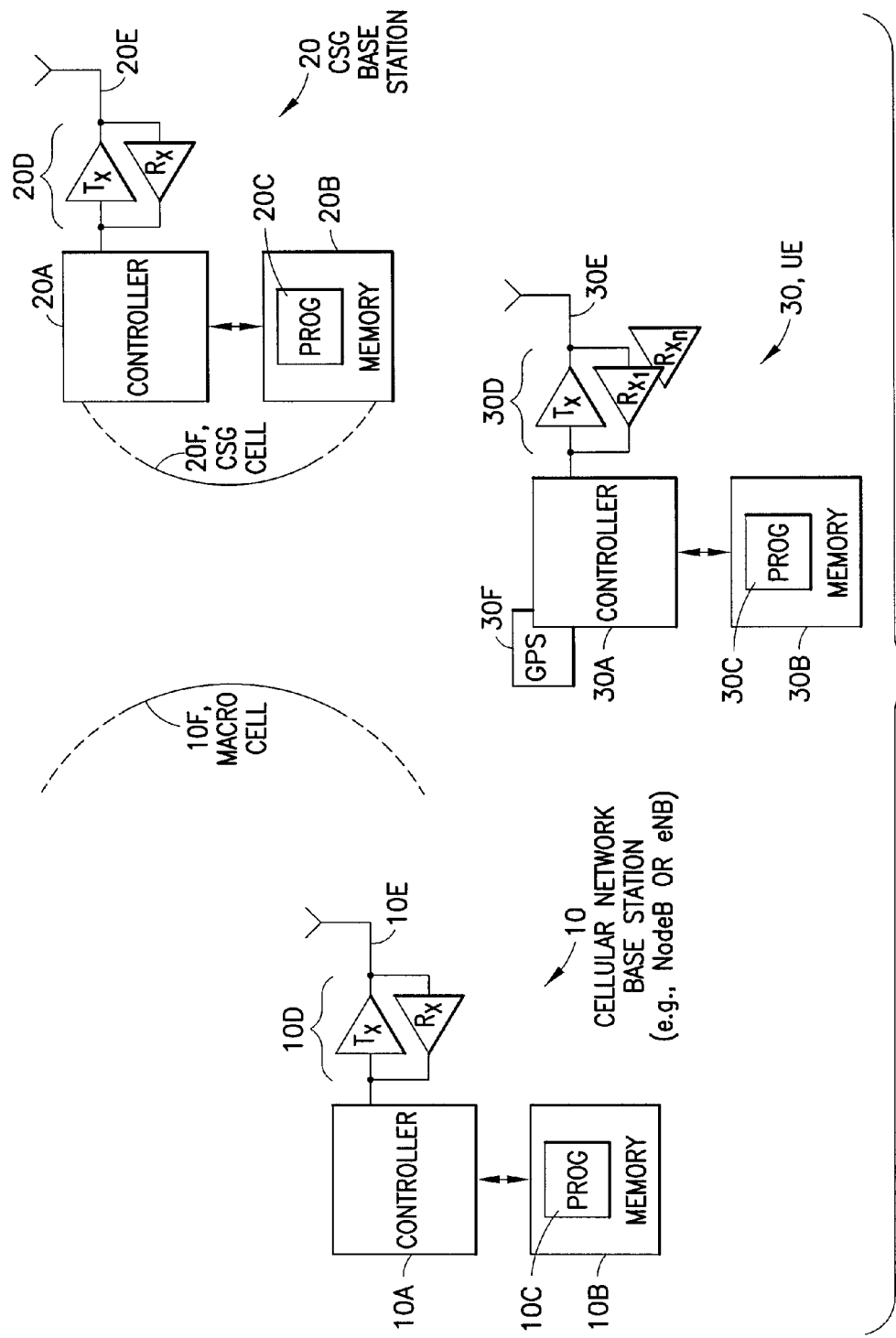
FIG. 4 shows a simplified block diagram of various exemplary electronic devices that are suitable for use in practicing the exemplary embodiments of this invention.

Before describing in further detail the exemplary embodiments of this invention, reference is made to FIG. 4 for illustrating a simplified block diagram of various exemplary electronic devices and apparatus that are suitable for use in practicing the exemplary embodiments of this invention. In FIG. 4, a cellular wireless network (also referred to herein without loss of generality as a macro network) is adapted for communication over wireless links with an apparatus, such as a mobile communication device which may be referred to as a UE 30, via a macro network access node or base station (BS) 10, such as a Node B or an eNB (e.g., where the macro network is compliant with LTE or LTE-A, Rel-8 or Rel-9 and above). Connectivity between the cellular network with infrastructure such as a telephone network and/or a data communications network (e.g., the Internet) is not shown for simplicity. Also shown in FIG. 4 is a "local network" or "home network" CSG base station 20.

For the purposes of describing the exemplary embodiments of this invention the cellular BS 10 is assumed to include at least one controller 10A, such as a computer or a data processor, at least one computer-readable memory medium embodied as a memory 10B that stores a program of computer instructions (PROG) 10C, and at least one suitable radio frequency (RF) transceiver 10D for bidirectional wireless communications with the UE 30 via one or more antennas 10E. Associated with the BS 10 is a macro cell 10F within which the UE 30 is enabled to receive cellular communication service.

For the purposes of describing the exemplary embodiments of this invention the CSG BS 20 is also assumed to include at least one controller 20A, such as a computer or a data processor, at least one computer-readable memory medium embodied as a memory 20B that stores a program of computer instructions (PROG) 20C, and at least one suitable radio frequency (RF) transceiver 20D for bidirectional wireless communications with the UE 30 via one or more antennas 20E. Associated with the BS 20 is a CSG cell 20F within which the UE 30 is enabled to receive local, CSG communication service. Note that typically the area of the macro cell 10F will be significantly larger than the area of the CSG cell 20F. For example, the macro cell 10F may extend outwards for several kilometers from a tower mounted antenna 10E, while the CSG cell 20F may extend outwards from the antenna 20E only for some tens of meters (e.g., a distance suitable to provide coverage within a home, office, business or building).

For the purposes of describing the exemplary embodiments of this invention the UE 30 is also assumed to include at least one controller 30A, such as a computer or a data processor, at least one computer-readable memory medium embodied as a memory 30B that stores a program of computer instructions (PROG) 30C, and at least one suitable radio frequency (RF) transceiver 30D for bidirectional wireless communications with the cellular BS 10 and/or the CSG base station 20, via at least one antenna 30E. In some exemplary embodiments, there may be two or more receivers ($Rx_1$-$Rx_n$) in the transceiver 30D, and in some exemplary embodiments there may be a position determination function, such as a GPS receiver and associated controller 30F.

In further exemplary embodiments, the UE 30 may comprise a measurement unit 30G coupled to the controller 30A. The measurement unit 30G is configured to enable the UE 30 to make various measurements regarding nearby cells, for example, in order to assist with cell/base station detection and reporting. In some exemplary embodiments, the measurement unit 30G may be embodied on, by or within the controller 30A, for example, as circuitry, one or more functions and/or one or more resident commands or programs to be executed by the controller 30A. In other exemplary embodiments, the measurement unit 30G may be embodied on, by or within the memory 30B, for example, as one or more programs, commands or functions.

The PROG 30C is assumed to include program instructions that, when executed by the associated controller 30A, enable the UE 30 to operate in accordance with the exemplary embodiments of this invention, as will be discussed below in greater detail, so as to signal and report to the cellular BS 10 a confidence level of having detected a correct CSG BS 20. The PROG 10C of the BS 10 is also assumed to be configured, when executed by the associated controller 10A, so as to receive and interpret this signaling from the UE 30, for the purposes of achieving an efficient and correct handover of the UE 30 from the BS 10 to the CSG BS 20.

It should be noted that, depending on the macro network implementation, the macro network functionality described below may be localized in the cellular BS 10, or it may be localized at a higher level in the macro network infrastructure, such as at a BS controller, or it may be distributed between the cellular BS 10 and one or more network infrastructure components.

In general, the exemplary embodiments of this invention may be implemented at least in part by computer software 10C, 20C, 30C executable by the respective controller 10A, 20A, 30A, or by hardware, or by a combination of software and hardware (and firmware).

In general, the various exemplary embodiments of the UE 30 can include, but are not limited to, mobile devices, mobile nodes, mobile stations, mobile phones, cellular phones, personal digital assistants (PDAs) having wireless communication capabilities, mobile routers, relay stations, relay nodes, computers, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 10B, 20B, 30B may be of any type suitable to the local technical environment and may be implemented using any suitable data storage technology, such as semiconductor based memory devices, flash memory, magnetic memory devices and systems, optical memory devices and systems, fixed memory and removable memory, as non-limiting examples. The controllers 10A, 20A, 30A may be of any type suitable to the local technical environment, and may include one or more of general purpose computers, special purpose computers, microprocessors, digital signal processors (DSPs) and processors based on multi-core processor architectures, as non-limiting examples.

While described above in reference to memories (10B, 20B, 30B), these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to controllers (10A, 20A, 30A), these components may generally be seen to correspond to processors, data processors, processing devices, processing components, processing blocks, circuits, circuit devices, circuit components, circuit blocks, integrated circuits and/or chips (e.g., chips comprising one or more circuits or integrated circuits).

Figure 6:
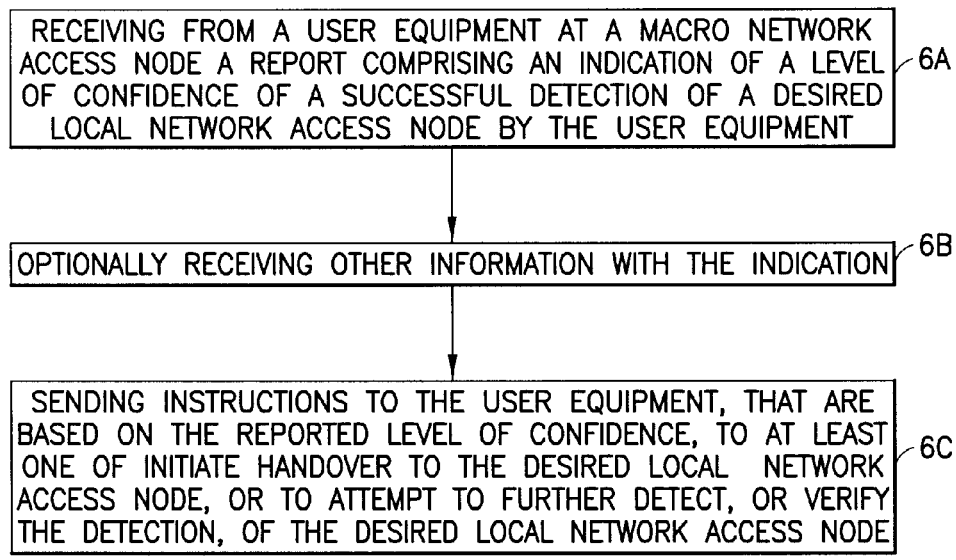
FIG. 6 is a logic flow diagram that illustrates the operation of an exemplary method, and a result of execution of exemplary computer program instructions embodied on a computer readable memory, further in accordance with the exemplary embodiments of this invention.
Figure 7:
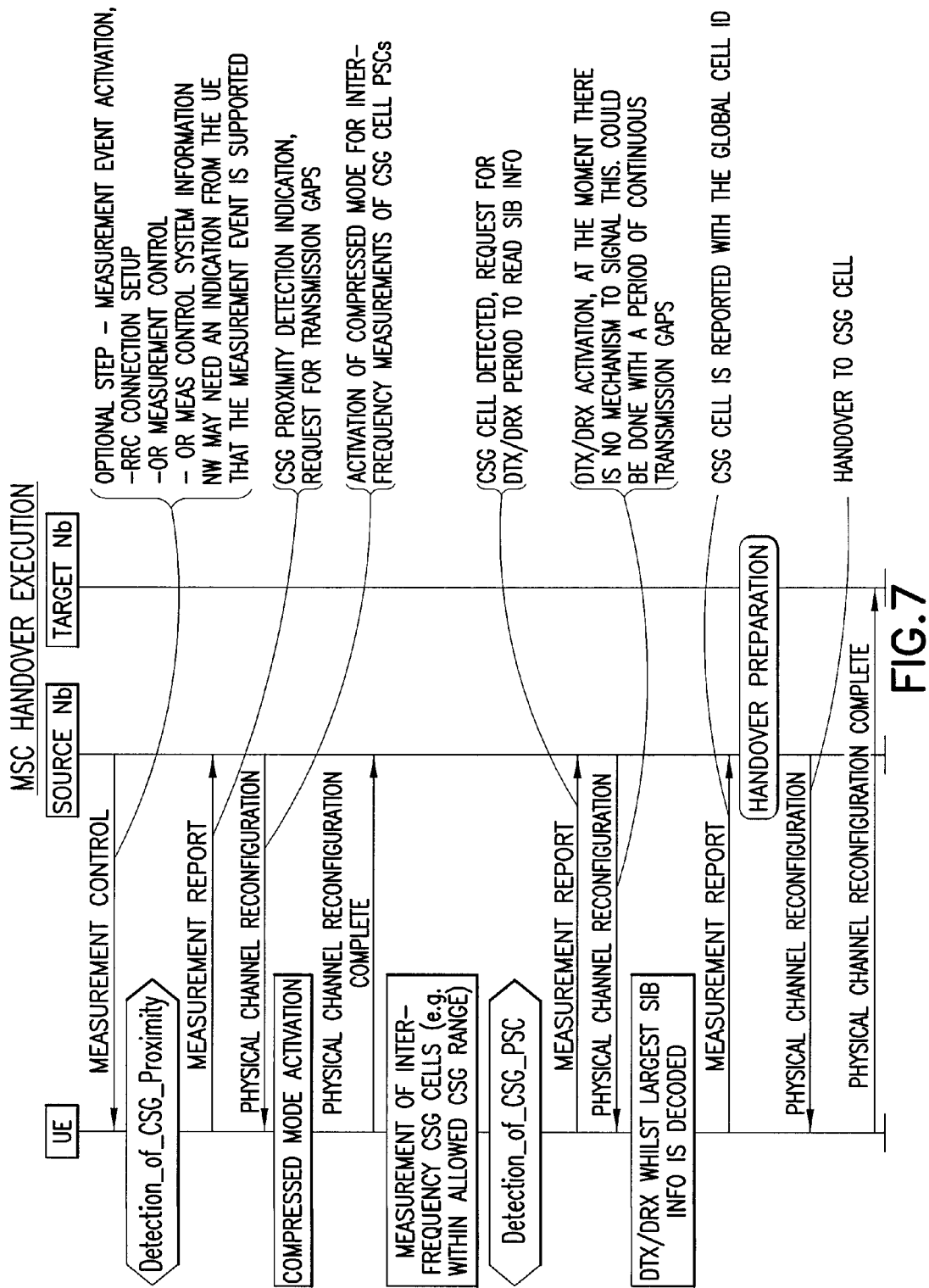
FIG. 7 is an exemplary message/signal flow diagram between a UE, a macro network BS and a CSG BS, and is useful in describing a UE internal measurement event approach for CSG cell proximity detection, which may or may not be used in conjunction with the exemplary embodiments of this invention.

Also before describing in further detail the exemplary embodiments of this invention, reference is now made to FIG. 7 for showing an exemplary message/signal flow diagram between a UE, a macro network BS ("SourceNb") and a CSG BS ("TargetNb"). FIG. 7 is useful in describing the above-referenced UE internal measurement event approach for CSG cell proximity detection. This particular approach may, or may not, be used in conjunction with the exemplary embodiments of this invention that are described in detail herein, for example, with reference to FIGS. 1-6.

More specifically, the approach outlined in FIG. 7 provides a method by which the UE 30 can autonomously request the activation of compressed mode, or longer periods of DTX/DRX, in order to facilitate mobility towards cells deployed in an uncontrolled manner (e.g., CSG cells).

A measurement event is sent in a measurement report to indicate that the UE 30 requires the activation of compressed mode. This event need not be based on the evaluation of existing measured event thresholds, and the criteria for sending this event may be left unspecified if desired.

The UE 30 could, for example, send this event when it determines the likely presence of the home cell 20F; it could send the event periodically to detect previously undetected CSG cells; or when the user requests the UE to search for CSG cells, as non-limiting examples.

At a minimum, the UE 30 is able to detect the macro network cell ID in which the UE 30 knows that its home CSG cell 20 is nearby. More advanced fingerprint methods are also possible for optimization of the trigger for this event.

The macro network responds to the measurement report, either by not allowing explicit measurement of the inter-frequency (no response), by triggering the compressed mode in order that the UE 30 can perform a closer inspection (i.e., make a physical measurement plus detection of the home cell 20), or by triggering the reading of the home cell system information either by gaps in transmission and reception, or by switching to the home cell frequency for a longer period of time to perform evaluation.

One prerequisite that may be assumed for any measurement of CSG cells is the presence of gaps in transmission in order to perform measurement and evaluation for the handover or cell reselection decision. The triggering of the presence of such gaps to perform handover evaluation is thus accommodated by the use of this technique.

FIG. 7 shows an example of new measurement event activation, triggering of a measurement event, and actions following the event trigger.

One option is for the UE 30 to autonomously trigger a measurement report, using new measurement event and measurement event ID. However, this approach may not be desirable in all cases since the UE 30 may send additional measurement reports to a network cell (to or via BS 10) not supporting the enhanced connected mode functionality towards CSG cells.

As a first example, assume that the UE 30 enters the connected mode and enables the new measurement event. The UE 30 then monitors the serving cell system information. The UE 30 detects a macro cell ID where it knows that the home CSG cell 20F is within the coverage of the macro cell. The UE 30 reports a new event trigger to the macro network in a MEASUREMENT REPORT message.

Another option is for the macro network to signal in some measurement control system information (system information) that the new type of measurement event is supported, and that those UEs 30 supporting the measurement event should enable it.

For example, and as above, the UE 30 reads system information in the idle mode, before entering the connected mode, to determine whether to enable the measurement event. Another option is for the macro network to enable and/or disable the measurement event by use of dedicated signaling while in the connected mode.

As an example of this approach, assume that the UE 30 enters the connected mode and that the macro network enables the new measurement event in a MEASUREMENT CONTROL message. The UE 30 monitors the serving cell system information and detects a macro cell ID where it knows that the home CSG cell 20F is within the coverage of the macro cell. The UE 30 reports a new event trigger to the macro network in a MEASUREMENT REPORT message.

A more optimized approach may be based on a combination of the first and second approaches (system information and explicit signaling). That is, with the use of existing measurement events it is possible to enable the measurement event by signaling in the system information, and it is also possible for the macro network to enable/disable/modify measurement events by using MEASUREMENT CONTROL message.

One exemplary implementation of reporting that the measurement event trigger has occurred is to reuse the existing message "MEASUREMENT REPORT" including a new event ID.

The macro network may respond to the new measurement event report in a number of ways. For example, the macro network may choose to send no response to the UE 30. This could be for any number of reasons, such as: (a) no support for enhanced CSG mobility, (b) no current capacity for additional UEs 30 operating in the compressed mode, or (c) no preference to perform inter-frequency mobility to a CSG cell 20F.

Alternatively, the macro network could respond to the new measurement event report by activation of the compressed mode in order that the UE 30 can perform inter-frequency measurement of CSG cells. This may or may not include reporting and detection of CSG IDs and/or cell identity. However, it may be assumed to at least include reporting of the CSG cell's frequency and PSC, if detected, in order to determine whether further evaluation is required by the UE 30 (see below) or whether to perform a handover.

The macro network may configure a new type of evaluation to command the UE 30 to further investigate the identity (CSG ID, Cell identity) of the target CSG cell. This request may follow the UE 30 reporting of the detection of frequency and PSC, or it may be in parallel (i.e., as an immediate response to the initial event report). Further evaluation may be a part of the handover evaluation (prior to issuance of the handover command), or as part of the handover execution (following the handover command, e.g., for radio link failure and reselection, conditional handover command, or cell reselection).

Describing now in further detail the exemplary embodiments of this invention, there are provided methods, apparatus and computer software by which the UE 30 can report the level of confidence, which may be expressed as a probability or in some other suitable manner, that the detection of a specific home base station (CSG BS 20) is successful. The exemplary embodiments of this invention provide for the use of new information to be reported in a measurement report to the cellular BS 10 to indicate the confidence level of the detection of the CSG cell 20.

In general, and referring by example to measurements and measurement reporting in the LTE (Rel-8) system, reference may be made to 3GPP TS 36.331 V8.5.0 (2009-03), Technical Specification 3rd Generation Partnership Project; Technical Specification Group Radio Access Network; Evolved Universal Terrestrial Radio Access (E-UTRA) Radio Resource Control (RRC); Protocol specification (Release 8), specifically section 5.5 "Measurements", pages 56-72.

Reference may also be made, with respect to UMTS, to 3GPP TS 25.331 V8.6.0 (2009-03), Technical Specification 3rd Generation Partnership Project; Technical Specification Group Radio Access Network; Radio Resource Control (RRC); Protocol specification (Release 8), specifically section 8.4 "Measurement procedures."

In some exemplary embodiments, the UE 30 reports a specific level of confidence (e.g., low, medium, high) or a probability (e.g., 10%, 90%) of successful CSG BS 20 detection. This information may or may not be accompanied by other information such as, for example, by information derived from the fingerprint method (e.g., using the GPS 30F, macro cell ID, cell PCI/PSC detection, actual system information reception via a second receiver of the transceiver 30D).

The reporting of the confidence-related information provides the cellular network BS 10 with a higher level of control, and with an ability to better decide on the actions to take next. These actions may include, but are not limited to, an immediate handover to the CSG BS 20 in the case of a high confidence level, an assignment of long gaps for acquiring system information in the case of a medium confidence level, or an assignment of compressed mode measurement gaps for cell PSC detection in the case of a low confidence level). This approach thus allows certain of the more cumbersome procedures to be avoided in the case of a higher confidence level in the UE-reported information.

Discussed now is measurement event reporting. One possible implementation of reporting the measurement event trigger confidence level or probability level information reuses an existing message "MEASUREMENT REPORT", although other existing messages may also be modified for this purpose. Also, a new message may be defined for this purpose.

If the fingerprint method that is used in the UE 30 is accurate (e.g., by using GPS co-ordinates of the home CSG cell 20F, by using some user-initiated method when the user arrives at home, or by the use of the UE 30 second receiver for decoding the home cell 20F), then the UE 30 can determine with a high probability (e.g., 90-100%) that a nearby home CSG cell is in fact the correct home CSG cell 20F. In this case the activation of the compressed mode, or any PSC/PCI confusion resolution mechanism (e.g., the use of large gaps for obtaining system information) is not necessary to initiate. This is beneficial, since it may be the case that utilization of any PSC/PCI confusion resolution mechanism may have a negative impact on the quality of service, and may reduce handover performance. In accordance with an aspect of the exemplary embodiments of this invention the cellular network BS 10 is instead enabled to proceed directly with a handover attempt to the CSG BS 20, with no further intermediate actions being required in the case where the UE 30 reports a high confidence level of having detected the correct CSG BS 20.

In the case where the UE 30 fingerprint method is basic (e.g., detection of a macro network cell ID) then the probability of being able to identify the correct CSG cell 20F may be low (e.g., 0-10%). In this case it is desirable to take further action, such as activation of the compressed mode for detection of the PSC/PCI. The UE 30 may also send a "low confidence" report periodically to request a search if it is unable to perform any type of fingerprinting procedure.

In case the UE 30 fingerprint is intermediate (e.g., it utilizes normal DTX/DRX to trigger detection of a PSC, but while still in the situation of not uniquely identifying a home CSG cell 20F) then the probability of successful CSG cell detection may be considered to be intermediate (e.g., in the range of about 30%-80%. In this case the macro network, including the BS 10, may determine whether to proceed with handover, with the knowledge that the probability of failure may be 50%, or the BS 10 can determine to take further action (e.g., activate another PSC confusion resolution mechanism).

Further, even without inclusion of the internal measurement event approach described above in relation to FIG. 7, it is possible to improve the PSC/PCI confusion resolution procedure with additional confidence information from the UE 30. For example the network can configure the compressed mode always in order to perform inter-frequency PSC detection. In this case some UEs 30 may report a lower confidence level since they are only able to detect PSC, while some UEs 30 may be able to also utilize information from the GPS 30F (if so equipped) to uniquely identify the CSG cell 20F without the need to request longer gaps for reading system information, causing service interruption, if the CSG cell 20F has been visited before. In other cases, where the CSG cell 20F was not previously visited, the UE 30 may report a lower confidence level in order to request that longer gaps be assigned to read system information. Note that some UEs 30, depending on their capabilities, may always need longer gaps and thus would always need to report a lower confidence level.

Discussed now is the measurement event response. In general, the macro network BS 10 may respond to the new measurement event report information in a number of ways, depending on the confidence level reported.

FIG. 1 shows compressed mode activation for a low confidence reported (e.g., periodic request or fingerprint with low accuracy). In this case the network BS 10 may respond to the new measurement event report by activation of the compressed mode in order that the UE 30 can perform interfrequency measurement of CSG cells 20F. This type of network response is more likely if the UE 30 reports a low level of confidence, a low probability of detection of a specific home CSG cell 20F, or if the UE 30 indicates the use of a fingerprint method which is known to have low accuracy. The low confidence may also be inferred from a periodic request by a UE 30 with limited or no fingerprint functionality for the compressed mode in order to perform a scan.

Figure 2:
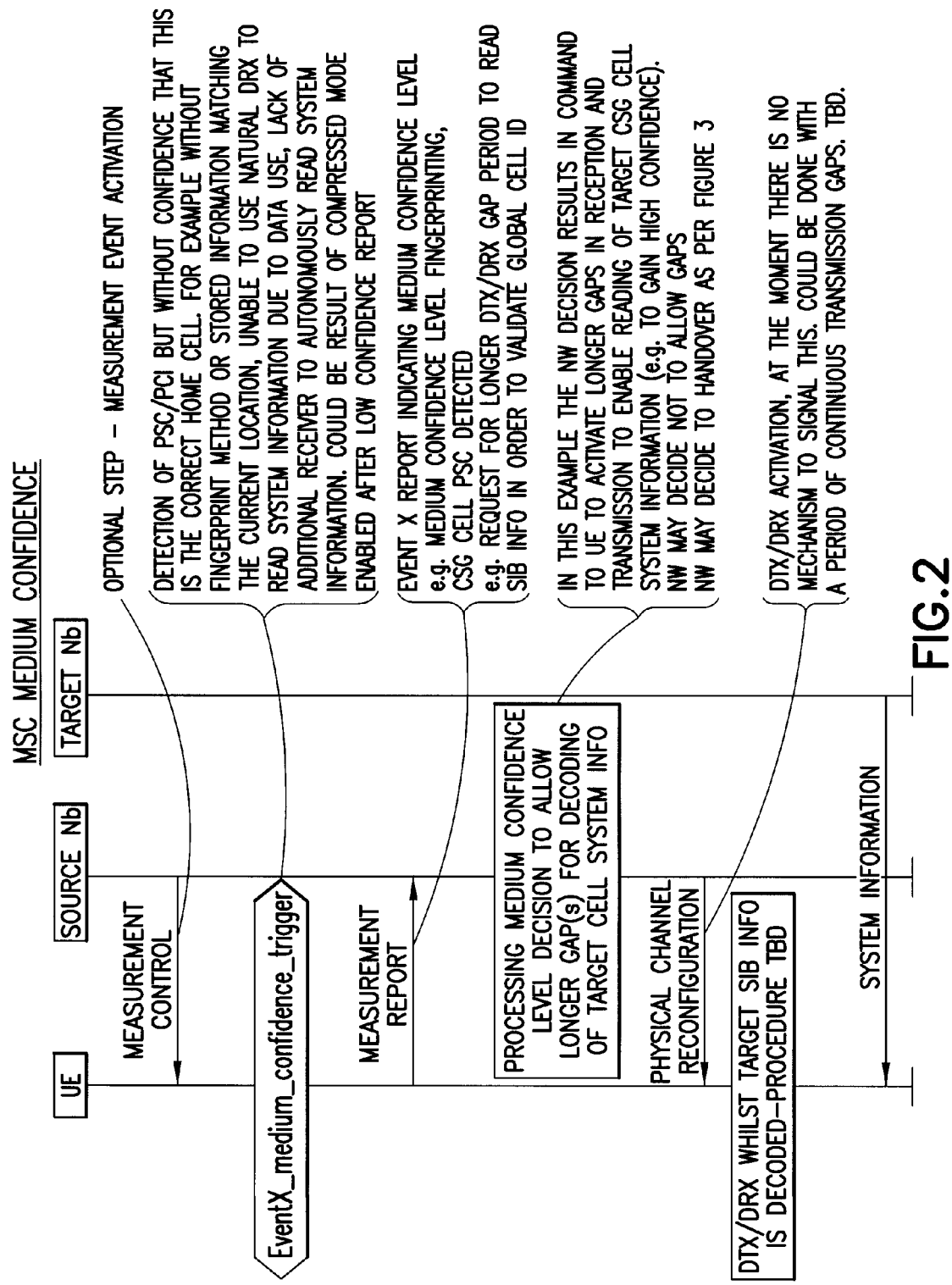

FIG. 2 shows a case of a further evaluation of the target CSG cell 20F when medium confidence is reported. In this case the macro network BS 10 may configure a new type of evaluation to command the UE 30 to further investigate the identity (e.g., the CSG ID, Cell identity) of the target CSG cell 20F. This request may be triggered by the UE 30 reporting detection of frequency and PSC, or a UE fingerprint with a medium level of confidence.

Figure 3:
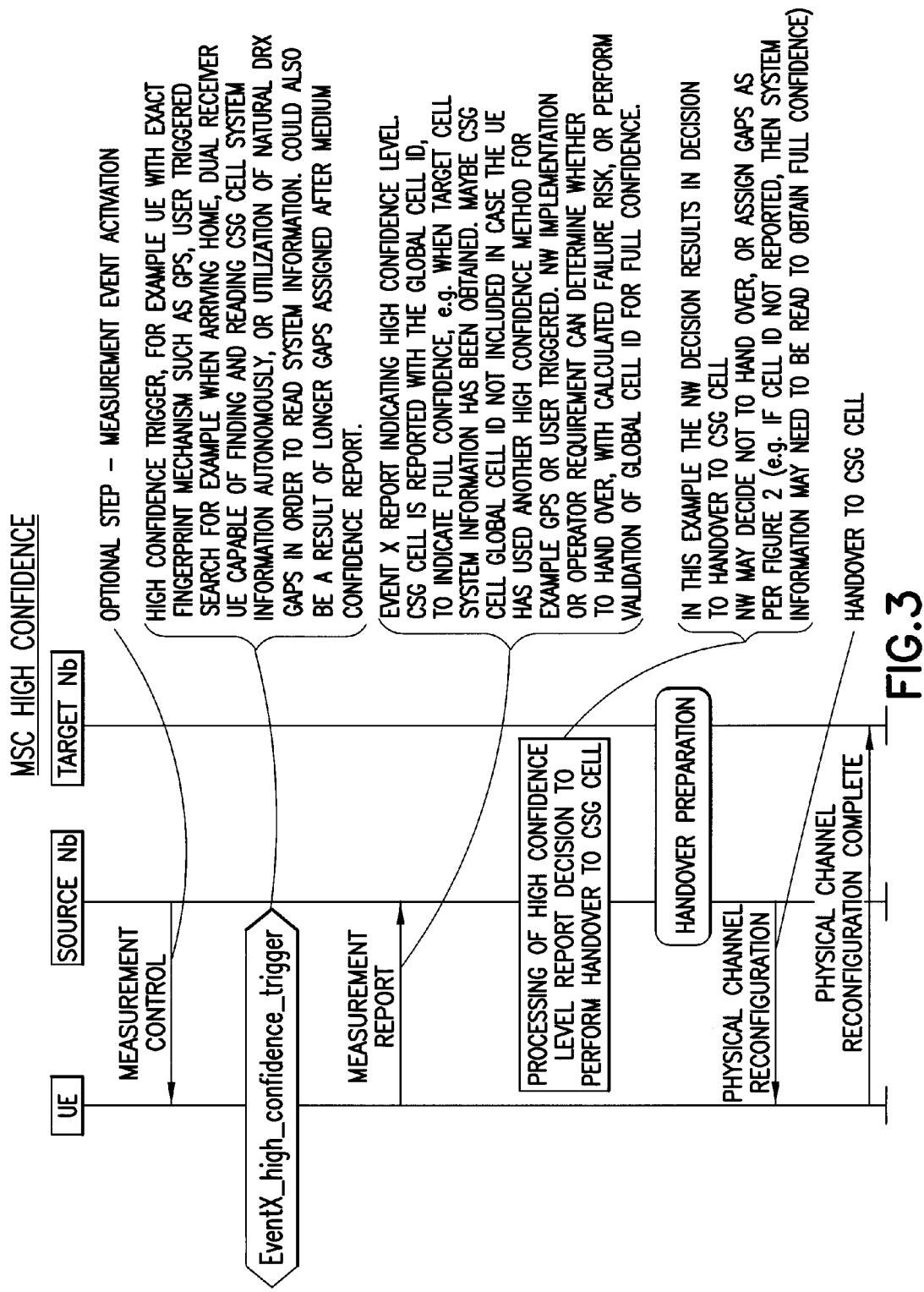

FIG. 3 shows a case of the issuance of a handover command when high confidence is reported. The handover command (to the CSG cell 20F) may be immediately issued by the macro network BS 10 if the UE 30 reports a high level of confidence, thereby beneficially avoiding any further intermediate evaluation procedures. This could, for example, follow from a reading of target cell system information, an accurate determination of the cell 20F location by use of the GPS 30F, by a user-triggered request for handover (e.g., once the user has arrived home and switched on the home BS 20).

There may also be varied responses that depend on the UE 30 and/or macro network implementation. In one case the measurement report may be sent multiple times in an overall evaluation sequence with different levels of confidence. For example, the first report may have a low confidence indicated, and be triggered as a result of autonomous CSG cell proximity detection, or by a periodic request for compressed mode to enable the UE 30 to scan for CSG cells, resulting in activation of compressed mode. A second report may then have medium confidence indicated, via detection of CSG cell PSC/PCI during the compressed mode, while a third report may have a high confidence indicated if the UE is able to uniquely identify the home cell 20F after more detailed evaluation of the home cell via, for example, the use of large gaps assigned for reading system information.

Thus, in some cases the various procedures depicted in FIGS. 1, 2 and 3 may be executed in sequence, such as the procedure of FIG. 1 followed by the procedure of FIG. 2, followed by the procedure of FIG. 3, as one non-limiting example.

Under some circumstances the UE 30 may be ready to report high confidence in the second report, for example if the UE 30 is able to utilize normal DRX periods for successfully reading target cell system information. In other configurations, (e.g., when there is no DRX configured, or during periods of high data activity) the UE 30 may not be able to read system information, but may instead be able only to detect a PSC/PCI. In this case the UE 30 would report medium confidence to the macro network BS 10, that in response may assign longer periods of DRX to obtain a higher confidence level.

Under some circumstances the UE 30 may be able to report high confidence in the first report, for example when accurate GPS location information is available, or a second receiver is available for automatic system information reception on another frequency. In this case the BS 10 may immediately assign the handover command to the UE 30. At other times the GPS location information may not be available (e.g., under bad weather conditions, or if the user has disabled the UE 10 GPS receiver), or the second receiver may not be available (e.g., while in dual cell mode of reception). In this case the UE 30 would not be able to report high confidence, but rather would report a lower confidence in order that the macro network BS 10 can take appropriate actions.

The high confidence report may be accompanied with the CGI/cell ID to indicate 100% (or nearly 100%) confidence. The high confidence report may also be accompanied with a "reason" to enable the BS 10 to treat the different reasons in different ways, for example, depending on network operator requirements.

In general, and as was indicated above, specified and testable rules may be desirable for each of the defined confidence levels.

There are clearly a number of valuable technical effects that can be achieved by the use of the exemplary embodiments of this invention. For example, the UE 30 is enabled to indicate the confidence level of an associated implementation-specific method for detecting CSG cells 20F. Further by example, the use of the exemplary embodiments of this invention provides the macro network with more information in order to determine more accurately the required actions needed for handover evaluation and triggering. Further by example, the use of the exemplary embodiments of this invention allows for a reduced impact on macro network capacity due to the potential to have fewer UEs 30 (e.g., those reporting a high or medium confidence level) operating with the compressed mode active. Further by example, the use of the exemplary embodiments of this invention enables the avoidance of procedures having a negative impact on handover performance, for example, due to advanced fingerprinting methods. Further by example, the use of the exemplary embodiments of this invention provides for those UEs 30 with higher capability or enhanced performance to also perform more optimally in the case of CSG handover evaluation (e.g., avoiding service interruption), while allowing reduced performance for those UEs 30 not as operationally advanced (e.g., using gaps in service for evaluation of the target cell), while still achieving as an end result a successful handover evaluation. Further by example, the use of the exemplary embodiments of this invention simplifies the macro network implementation in the case where the UE 30 performs the full confidence reporting sequence as per FIGS. 1, 2 and 3. That is, the macro network BS 10 need not record at what stage the UE 30 is in the evaluation, as it may respond to a given level of confidence in a fixed manner.

It should be noted that the macro network BS 10 may determine the level of confidence from confidence level information that is explicitly given by the UE 30 in the Measurement Report message, e.g., high, medium, or low, or 100%, 50%, or 10%, or the macro network BS 10 may determine the level of confidence that is implicit from other information that is given (or that is not given) by the UE 30 in the Measurement Report message. For example, a report containing GPS-derived CSG cell coordinates would implicitly indicate to the macro network BS 10 a high level of confidence of the UE 30 having correctly detected the CSG cell 20F, while a report that contains instead only PSC/PCI information would implicitly indicate a lower level of confidence of the UE 30 having correctly detected the CSG cell 20F. Further by example, if the PSC/PCI is not available in the report made to the macro network BS 10 then it could imply a low confidence level in proximity of the CSG cell, which in turn may trigger UE 30 operation in the compressed mode. Further by example, if the UE 30 reported the PSC but not the CGI, then it is implicitly indicated to the macro network BS 10 that UE 30 operation with longer gaps may be desirable in order to read system information from the target cell.

As a further example of implicit signaling of confidence level, consider a case where there are three levels of confidence: low, medium and high. For low confidence, in the Measurement Report message the UE 30 includes a CSG proximity indication. For medium confidence, in the Measurement Report message the UE 30 includes PSC/PCI reporting. For high confidence, in the Measurement Report message the UE 30 includes cell identity reporting (e.g., inclusion of one or more of "Cell identity," "CSG ID" and "CSG member indication"). Thus, when the BS 10 receives the corresponding type of information (e.g., and not one or more of the other types of information) it can infer the level of confidence in the Measurement Report from the UE 30.

Low confidence may indicate that the UE 30 may be near to a home cell. Medium confidence may indicate that the UE 30 has detected a home cell but is not entirely sure that it is the correct home cell (e.g., due to the fact that multiple cells may have the same PSC/PCI). High confidence may indicate that the UE 30 has verified the specific cell identity (e.g., the UE 30 can uniquely identify the cell in question). The response by the BS 10 may be similar to those actions described above for these levels of confidence.

In further exemplary embodiments, there may only be two levels of confidence: low and high. As a non-limiting example, intra-frequency may only have two levels of confidence (e.g., low and high) while inter-frequency or inter-RAT has three levels (e.g., low, medium and high).

As another example, if the UE is able to read system information and verify member status, it includes "CSG member indication" and sets the IE to "member," indicating a high level of confidence. If the UE is unable to read system information, it may send only the "Cell measured results" IE, indicating only the PSC and, thus, a medium level of confidence. In some cases, the network may have enabled the UE only to be able to report PSC (e.g., corresponding to a medium level of confidence) by not including the IE "Intra-frequency SI acquisition." In such a case, the indication of the PSC by the UE may constitute a request to be allowed to report "Cell identity" and/or other IEs/information.

As a further example, if the UE detects that it is in the proximity of a cell on the correct frequency (e.g., a frequency of a system whose CSG ID is in the UE's CSG whitelist), the UE may set the "CSG Proximity Indication" IE accordingly (e.g., to "entering") and signal the same to the Node B. This reporting of proximity (e.g., indicating a low or medium level of confidence) may be enabled at any time, in parallel to the above-described measurement configurations or alone. If it is enabled alone, the UE can use this low confidence trigger to request further measurement configurations. If it is configured in parallel, the UE can use it to indicate that it is close but unable to detect or verify (e.g., a low or medium confidence).

By using the type of signaled information (e.g., from the Measurement Report) to implicitly signal a level of confidence, not only can the above-noted benefits and advantages be realized, but extra signaling and overhead may be avoided.

Based on the foregoing it should be apparent that the exemplary embodiments of this invention provide a method, apparatus and computer program(s) to enhance by the use of a confidence level indication the handover of a mobile communication device to a local network access node from a macro network access node.

Figure 5:
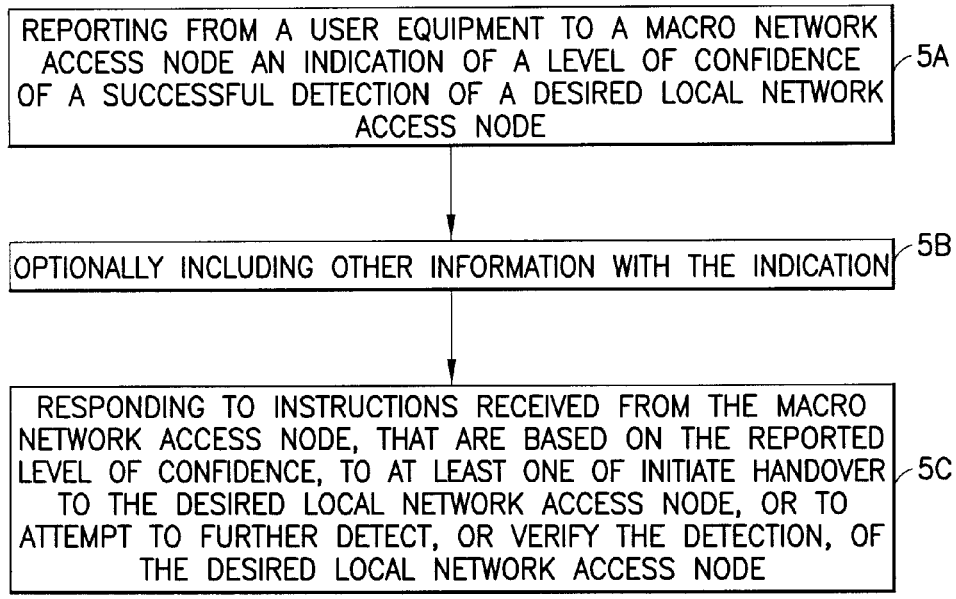
FIG. 5 is a logic flow diagram that illustrates the operation of an exemplary method, and a result of execution of exemplary computer program instructions embodied on a computer readable memory, in accordance with the exemplary embodiments of this invention.

FIG. 5 is a logic flow diagram that illustrates the operation of an exemplary method, and a result of execution of exemplary computer program instructions, in accordance with the exemplary embodiments of this invention. In accordance with these exemplary embodiments a method performs, at Block 5A, an operation of reporting from a user equipment to a macro network access node an indication of a level of confidence of a successful detection of a desired local network access node. At Block 5B there is an optional operation of including other information with the indication. At Block 5C there is an operation of responding to instructions received from the macro network access node, that are based on the reported level of confidence, to at least one of initiate handover to the desired local network access node, or to attempt to further detect, or verify the detection, of the desired local network access node.

The method as in FIG. 5, where the indication is included as part of a measurement report message. The method as in FIG. 5, where the indication of the level of confidence is expressed as a probability of successful detection. The method as in FIG. 5, where the indication of the level of confidence is not explicitly specified, but is instead implied from the other information. The method as in FIG. 5, where the reporting is initiated autonomously by the user equipment. The method as in FIG. 5, where the reporting is initiated in response to a measurement control message received from the macro network access node.

The method as in any of the previous, where reporting occurs while the user equipment is in a connected mode with the macro network access node. The method as in any of the previous, where the other information is derived from at least one of GPS location information, a macro cell ID, PCI/PSC detection, a measured frequency, and system information received from a local network access node. The method as in any of the previous, where the local network access node comprises a closed subscriber group base station. The method as in any of the previous, where the received instructions, if handover is not ordered, comprise at least one of operation of the user equipment in a compressed mode or with gaps in transmission and reception.

FIG. 6 is a logic flow diagram that illustrates the operation of an exemplary method, and a result of execution of exemplary computer program instructions, further in accordance with the exemplary embodiments of this invention. In accordance with these exemplary embodiments a method performs, at Block 6A, an operation of receiving from a user equipment at a macro network access node a report comprising an indication of a level of confidence of a successful detection of a desired local network access node by the user equipment. At Block 6B there is an optional operation of receiving other information with the indication. At Block 6C there is an operation of sending instructions to the user equipment, that are based on the reported level of confidence, to at least one of initiate handover to the desired local network access node, or to attempt to further detect, or verify the detection, of the desired local network access node.

The method as in FIG. 6, where the indication is received as part of a measurement report message. The method as in FIG. 6, where the indication of the level of confidence is expressed as a probability of successful detection. The method as in FIG. 6, where the indication of the level of confidence is not explicitly specified to the macro network access node, but is instead implied by the access node from the other information. The method as in FIG. 6, where the reporting is initiated autonomously by the user equipment. The method as in FIG. 6, where the sending of the report by the user equipment is initiated in response to a measurement control message sent from the macro network access node.

The method as in any of the previous, where receiving the report occurs while the user equipment is in a connected mode with the macro network access node. The method as in any of the previous, where the other information is derived from at least one of GPS location information, a macro cell ID, PCI/PSC detection, a measured frequency, and system information received from a local network access node. The method as in any of the previous, where the local network access node comprises a closed subscriber group base station. The method as in any of the previous, where the instructions sent to the user equipment, if handover is not ordered, comprise at least one of operation of the user equipment in a compressed mode or with gaps in transmission and reception.

The various blocks shown in FIGS. 5 and 6 may be viewed as method steps, and/or as operations that result from operation of computer program code, and/or as a plurality of coupled logic circuit elements constructed to carry out the associated function(s).

Figure 14:
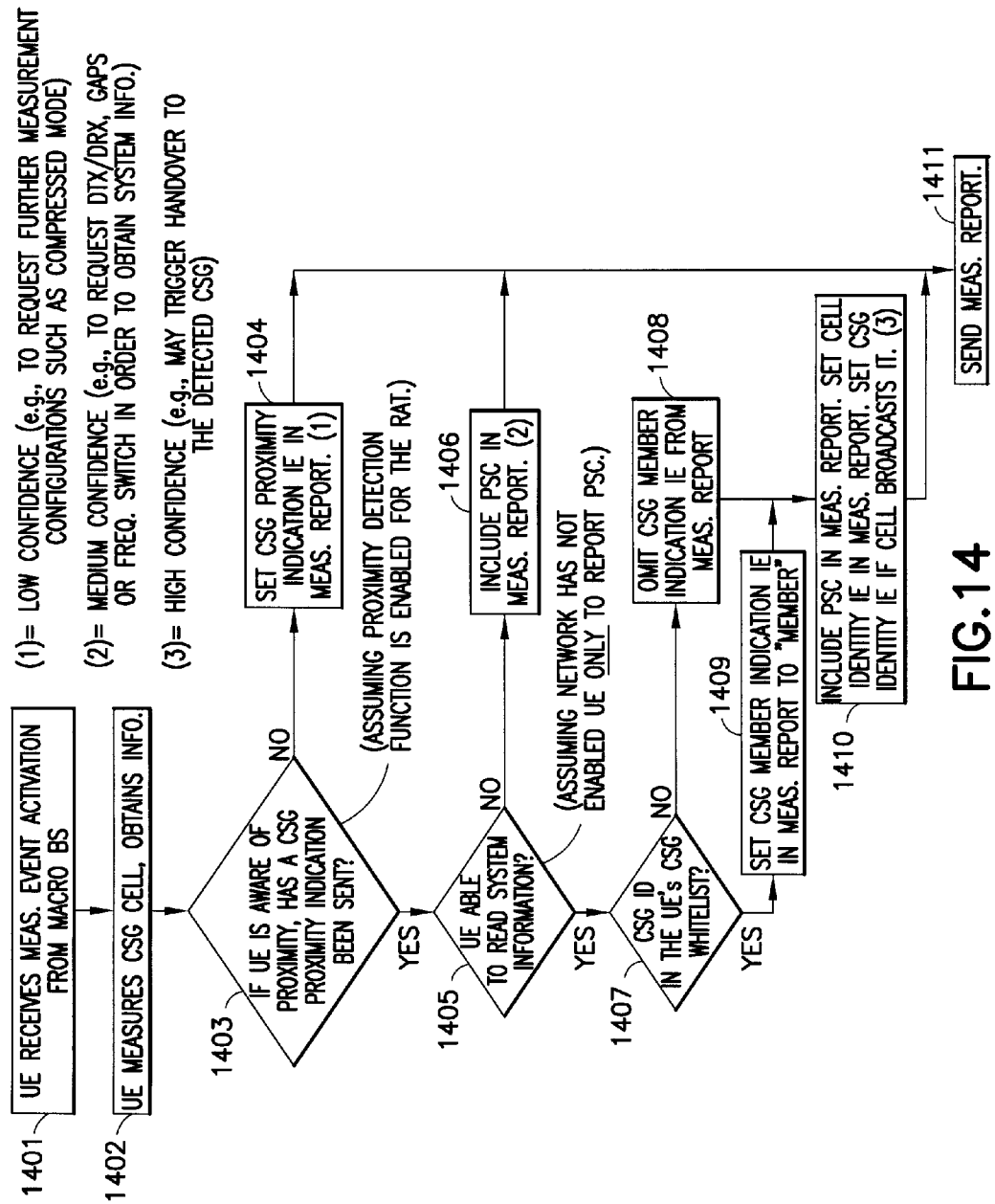

FIG. 14 is a logic flow diagram that illustrates the operation of an exemplary method, and a result of execution of exemplary computer program instructions, in accordance with the exemplary embodiments of this invention. At 1401, a UE receives a measurement event activation from a macro BS. Note that step 1401 may be optional in some exemplary embodiments. As used below, "nearby cell" refers to a local network cell or local network access node (e.g., a CSG cell, a CSG access node) as detected by the UE. At 1402, the UE measures a nearby cell (e.g., a CSG cell) to obtain information on it. At 1403, if the UE is aware of proximity (i.e., a nearby cell, a nearby CSG cell), has a CSG Proximity Indication been sent (e.g., to the macro BS)? If not, at 1404 a CSG Proximity Indication IE is set in a measurement report (to be sent at 1411). If yes at 1403, at 1405 was the UE able to read system information (i.e., for the CSG cell, a CSG ID)? If not, at 1406 the PSC of the nearby cell is included in the measurement report (to be sent at 1411). If yes at 1405, at 1407 is the CSG ID in the UE's CSG whitelist? If not, at 1408 the CSG Member indication IE is omitted from the measurement report and the method/process proceeds to 1410. If yes at 1407, the CSG Member indication IE in the measurement report is sent to "member" and the method/process proceeds to 1410. At 1410, the PSC is included in the measurement report and the Cell Identity IE in the measurement report is set. Also at 1410, the CSG Identity IE in the measurement report is set if the nearby cell broadcasts it. At 1411, the measurement report, as configured in view of the previous steps, is sent (e.g., from the UE to the macro BS).

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 8:
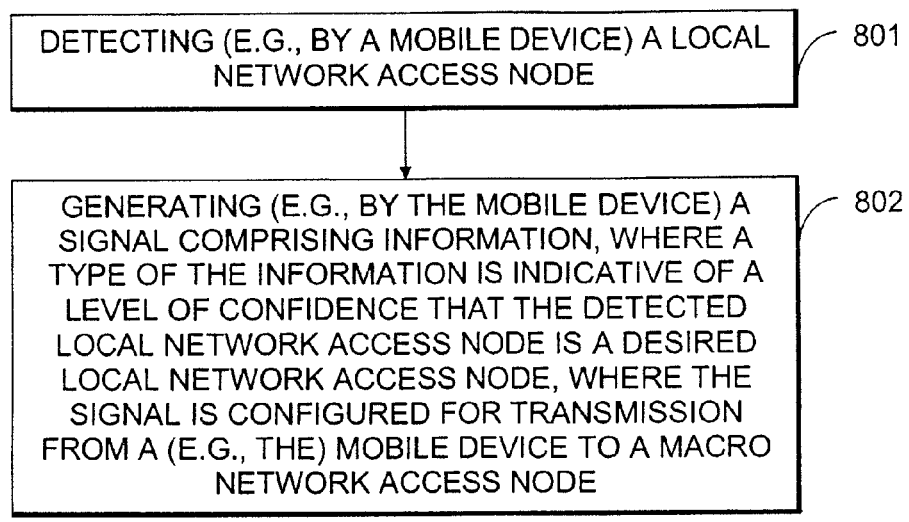
FIGS. 8-15 are logic flow diagrams that illustrate the operation of exemplary methods, and a result of execution of exemplary computer program instructions embodied on a computer readable memory, further in accordance with the exemplary embodiments of this invention.

In one exemplary embodiment, and with reference to FIG. 8, a method comprising: detecting (e.g., by a mobile device) a local network access node (801); and generating (e.g., by the mobile device) a signal comprising information, where a type of the information is indicative of a level of confidence that the detected local network access node is a desired local network access node, where the signal is configured for transmission from a (e.g., the) mobile device to a macro network access node (802).

A method as in any above, where the level of confidence is one of low, medium or high, where the type of the information comprising a closed subscriber group proximity indication is indicative of the low level of confidence, where the type of the information comprising primary scrambling code/physical cell identifier reporting is indicative of the medium level of confidence, where the type of the information comprising cell identity reporting is indicative of the high level of confidence. A method as in any above, where the signal comprises a measurement report or a measurement report message.

A method as above, further comprising: sending the signal from the mobile device to the macro network access node. A method as above, further comprising: receiving (e.g., by the mobile device) instructions from the macro network access node, where the received instructions are based on the indicated level of confidence. A method as above, where the received instructions are to at least one of initiate a handover from the macro network access node to the detected local network access node, and to attempt to further detect, or verify the detection, of the local network access node. A method as in any above, where the received instructions (e.g., if handover is not ordered) comprise at least one of operation of the mobile device in a compressed mode and operation of the mobile device with gaps in at least one of transmission and reception.

A method as in any above, where at least one of detecting and generating is initiated autonomously by the mobile device. A method as in any above, where at least one of detecting an generating is initiated in response to a measurement control message received by the mobile device from the macro network access node. A method as in any above, where at least one of detecting and generating occurs while the mobile device is in a connected mode with the macro network access node. A method as in any above, where the information is derived from at least one of GPS location information, a macro cell ID, PCI/PSC detection, a measured frequency, and system information received from the detected local network access node. A method as in any above, where the local network access node comprises a closed subscriber group base station.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A computer program comprising machine readable instructions which when executed by a mobile device control it to perform the method of any one of the above. A method as in any above, further comprising one or more aspects of the exemplary embodiments of the invention as described herein.

(2) In another exemplary embodiment, a program storage device readable by a machine, tangibly embodying a program of instructions executable by the machine for performing operations, said operations comprising: detecting (e.g., by a mobile device) a local network access node (801); and generating (e.g., by the mobile device) a signal comprising information, where a type of the information is indicative of a level of confidence that the detected local network access node is a desired local network access node, where the signal is configured for transmission from a (e.g., the) mobile device to a macro network access node (802).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(3) In another exemplary embodiment, an apparatus comprising: at least one processor; and at least one memory including computer program code, the at least one memory and the computer program code being configured to, with the at least one processor, cause the apparatus at least to perform: detect a local network access node; and generate a signal comprising information, where a type of the information is indicative of a level of confidence that the detected local network access node is a desired local network access node, where the signal is configured for transmission from the apparatus to a macro network access node.

An apparatus as in any above, where the apparatus comprises a mobile device, a mobile station, a mobile node, a mobile phone, a cell phone, a user equipment or a portable electronic device. An apparatus as in any above, embodied in at least one integrated circuit. An apparatus as in any above, further comprising one or more aspects of the exemplary embodiments of the invention as described herein.

(4) In another exemplary embodiment, an apparatus comprising: means for detecting (e.g., by a mobile device) a local network access node; and means for generating (e.g., by the mobile device) a signal comprising information, where a type of the information is indicative of a level of confidence that the detected local network access node is a desired local network access node, where the signal is configured for transmission from the apparatus to a macro network access node.

An apparatus as in any above, where the means for detecting comprises at least one of a measurement unit, a controller and a processor, and where the means for generating comprises at least one of a measurement unit, a controller and a processor. An apparatus as in any above, embodied in at least one integrated circuit. An apparatus as in any above, further comprising one or more aspects of the exemplary embodiments of the invention as described herein.

(5) In another exemplary embodiment, an apparatus comprising: detection circuitry configured to detect a local network access node; and signal generation circuitry configured to generate a signal comprising information, where a type of the information is indicative of a level of confidence that the detected local network access node is a desired local network access node, where the signal is configured for transmission from the apparatus to a macro network access node.

An apparatus as in any above, embodied in at least one integrated circuit. An apparatus as in any above, further comprising one or more aspects of the exemplary embodiments of the invention as described herein.

Figure 9:
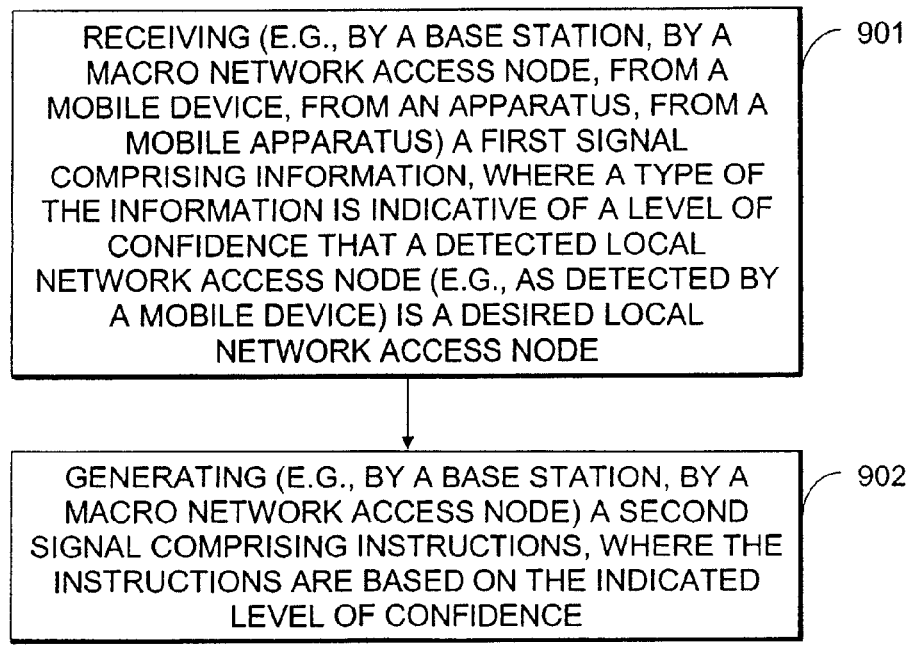

(6) In another exemplary embodiment, and with reference to FIG. 9, a method comprising: receiving (e.g., by a base station, by a macro network access node, from a mobile device, from an apparatus, from a mobile apparatus) a first signal comprising information, where a type of the information is indicative of a level of confidence that a detected local network access node (e.g., as detected by a mobile device) is a desired local network access node (901); and generating (e.g., by a base station, by a macro network access node) a second signal comprising instructions, where the instructions are based on the indicated level of confidence (902).

A method as above, further comprising: determining, based on the received signal (e.g., the information of the received signal), the level of confidence. A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A computer program comprising machine readable instructions which when executed by a device (an apparatus) control it to perform the method of any one of the above. A method as in any above, further comprising one or more aspects of the exemplary embodiments of the invention as described herein.

(7) In another exemplary embodiment, a program storage device readable by a machine, tangibly embodying a program of instructions executable by the machine for performing operations, said operations comprising: receiving (e.g., by a base station, by a macro network access node, from a mobile device, from an apparatus, from a mobile apparatus) a first signal comprising information, where a type of the information is indicative of a level of confidence that a detected local network access node (e.g., as detected by a mobile device) is a desired local network access node (901); and generating (e.g., by a base station, by a macro network access node) a second signal comprising instructions, where the instructions are based on the indicated level of confidence (902).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(8) In another exemplary embodiment, an apparatus comprising: at least one processor; and at least one memory including computer program code, the at least one memory and the computer program code being configured to, with the at least one processor, cause the apparatus at least to perform: receive (e.g., by a base station, by a macro network access node, from a mobile device, from an apparatus, from a mobile apparatus) a first signal comprising information, where a type of the information is indicative of a level of confidence that a detected local network access node (e.g., as detected by a mobile device) is a desired local network access node; and generate (e.g., by a base station, by a macro network access node) a second signal comprising instructions, where the instructions are based on the indicated level of confidence.

An apparatus as in any above, embodied in at least one integrated circuit. An apparatus as in any above, further comprising one or more aspects of the exemplary embodiments of the invention as described herein.

(9) In another exemplary embodiment, an apparatus comprising: means for receiving (e.g., by a base station, by a macro network access node, from a mobile device, from an apparatus, from a mobile apparatus) a first signal comprising information, where a type of the information is indicative of a level of confidence that a detected local network access node (e.g., as detected by a mobile device) is a desired local network access node; and means for generating (e.g., by a base station, by a macro network access node) a second signal comprising instructions, where the instructions are based on the indicated level of confidence.

An apparatus as above, where the means for receiving comprises at least one receiver and the means for generating comprises at least one processor. An apparatus as in any above, embodied in at least one integrated circuit. An apparatus as in any above, further comprising one or more aspects of the exemplary embodiments of the invention as described herein.

(10) In another exemplary embodiment, an apparatus comprising: reception circuitry configured to receive (e.g., by a base station, by a macro network access node, from a mobile device, from an apparatus, from a mobile apparatus) a first signal comprising information, where a type of the information is indicative of a level of confidence that a detected local network access node (e.g., as detected by a mobile device) is a desired local network access node; and signal generation circuitry configured to generate (e.g., by a base station, by a macro network access node) a second signal comprising instructions, where the instructions are based on the indicated level of confidence.

An apparatus as in any above, embodied in at least one integrated circuit. An apparatus as in any above, further comprising one or more aspects of the exemplary embodiments of the invention as described herein.

Figure 10:
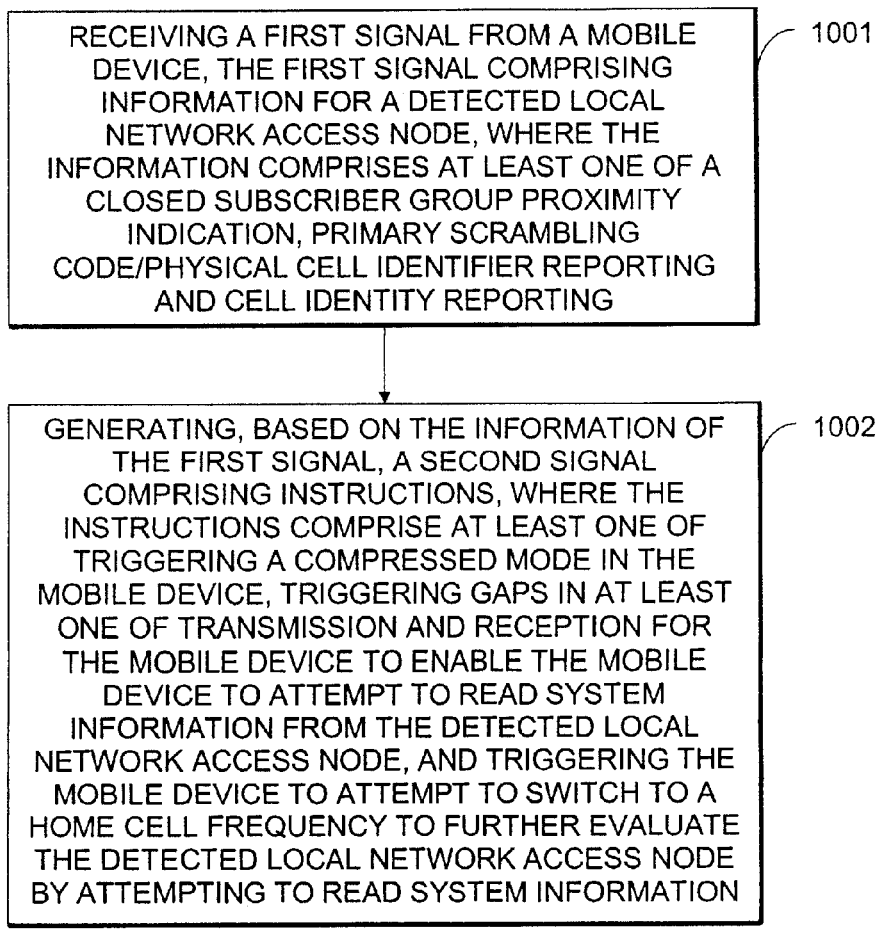

(11) In another exemplary embodiment, and with reference to FIG. 10, a method comprising: receiving a first signal from a mobile device, the first signal comprising information for a detected local network access node, where the information comprises at least one of a closed subscriber group proximity indication, primary scrambling code/physical cell identifier reporting and cell identity reporting (1001); and generating, based on the information of the first signal, a second signal comprising instructions, where the instructions comprise at least one of triggering a compressed mode in the mobile device, triggering gaps in at least one of transmission and reception for the mobile device to enable the mobile device to attempt to read system information from the detected local network access node, and triggering the mobile device to attempt to switch to a home cell frequency to further evaluate the detected local network access node by attempting to read system information (1002).

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A computer program comprising machine readable instructions which when executed by a device (an apparatus) control it to perform the method of any one of the above. A method as in any above, further comprising one or more aspects of the exemplary embodiments of the invention as described herein.

(12) In another exemplary embodiment, a program storage device readable by a machine, tangibly embodying a program of instructions executable by the machine for performing operations, said operations comprising: receiving a first signal from a mobile device, the first signal comprising information for a detected local network access node, where the information comprises at least one of a closed subscriber group proximity indication, primary scrambling code/physical cell identifier reporting and cell identity reporting (1001); and generating, based on the information of the first signal, a second signal comprising instructions, where the instructions comprise at least one of triggering a compressed mode in the mobile device, triggering gaps in at least one of transmission and reception for the mobile device to enable the mobile device to attempt to read system information from the detected local network access node, and triggering the mobile device to attempt to switch to a home cell frequency to further evaluate the detected local network access node by attempting to read system information (1002).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(13) In another exemplary embodiment, an apparatus comprising: at least one processor; and at least one memory including computer program code, the at least one memory and the computer program code being configured to, with the at least one processor, cause the apparatus at least to perform: receive a first signal from a mobile device, the first signal comprising information for a detected local network access node, where the information comprises at least one of a closed subscriber group proximity indication, primary scrambling code/physical cell identifier reporting and cell identity reporting; and generate, based on the information of the first signal, a second signal comprising instructions, where the instructions comprise at least one of triggering a compressed mode in the mobile device, triggering gaps in at least one of transmission and reception for the mobile device to enable the mobile device to attempt to read system information from the detected local network access node, and triggering the mobile device to attempt to switch to a home cell frequency to further evaluate the detected local network access node by attempting to read system information.

An apparatus as in any above, embodied in at least one integrated circuit. An apparatus as in any above, further comprising one or more aspects of the exemplary embodiments of the invention as described herein.

(14) In another exemplary embodiment, an apparatus comprising: means for receiving a first signal from a mobile device, the first signal comprising information for a detected local network access node, where the information comprises at least one of a closed subscriber group proximity indication, primary scrambling code/physical cell identifier reporting and cell identity reporting; and means for generating, based on the information of the first signal, a second signal comprising instructions, where the instructions comprise at least one of triggering a compressed mode in the mobile device, triggering gaps in at least one of transmission and reception for the mobile device to enable the mobile device to attempt to read system information from the detected local network access node, and triggering the mobile device to attempt to switch to a home cell frequency to further evaluate the detected local network access node by attempting to read system information.

An apparatus as above, where the means for receiving comprises at least one receiver and the means for generating comprises at least one processor. An apparatus as in any above, embodied in at least one integrated circuit. An apparatus as in any above, further comprising one or more aspects of the exemplary embodiments of the invention as described herein.

(15) In another exemplary embodiment, an apparatus comprising: reception circuitry configured to receive a first signal from a mobile device, the first signal comprising information for a detected local network access node, where the information comprises at least one of a closed subscriber group proximity indication, primary scrambling code/physical cell identifier reporting and cell identity reporting; and signal generation circuitry configured to generate, based on the information of the first signal, a second signal comprising instructions, where the instructions comprise at least one of triggering a compressed mode in the mobile device, triggering gaps in at least one of transmission and reception for the mobile device to enable the mobile device to attempt to read system information from the detected local network access node, and triggering the mobile device to attempt to switch to a home cell frequency to further evaluate the detected local network access node by attempting to read system information.

An apparatus as in any above, embodied in at least one integrated circuit. An apparatus as in any above, further comprising one or more aspects of the exemplary embodiments of the invention as described herein.

Figure 11:
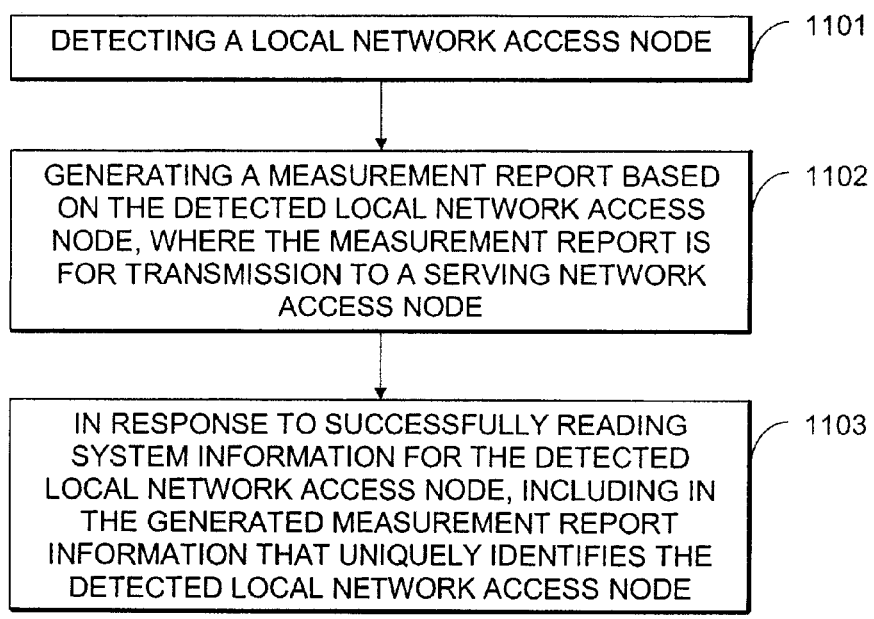

(16) In another exemplary embodiment, and with reference to FIG. 11, a method comprising: detecting a local network access node (1101); generating a measurement report based on the detected local network access node, where the measurement report is for transmission to a serving network access node (1102); and in response to successfully reading system information for the detected local network access node, including in the generated measurement report information that uniquely identifies the detected local network access node (1103).

A method as in any above, further comprising: in response to successfully or unsuccessfully reading the system information for the detected local network access node, including in the generated measurement report a primary scrambling code of the detected local network access node. A method as in any above, further comprising: in response to determining that a closed subscriber group (CSG) proximity indication (e.g., for the detected local network access node) has not been sent to a serving network access node, including a CSG proximity indication in the generated measurement report. A method as in any above, where including the information in the generated measurement report comprises setting an information element in the generated measurement report to uniquely identify the detected local network access node. A method as above, where the information element comprises a closed subscriber group identity information element. A method as in any above, further comprising: in response to successfully reading a primary scrambling code (e.g., for the detected local network access node), including in the generated measurement report the primary scrambling code (e.g., of the detected local network access node).

A method as in any above, where the information comprises a closed subscriber group (CSG) identifier for the detected local network access node. A method as above, further comprising: in response to determining that the CSG identifier is in a CSG whitelist, including CSG member information in the generated measurement report, where the CSG member information indicates that the CSG identifier for the detected local network access node is in the CSG whitelist. A method as above, where including the CSG member information in the generated measurement report comprises setting an information element in the generated measurement report. A method as above, where the information element comprises a CSG Member indication information element. A method as above, where setting the CSG Member indication information element comprises setting the CSG Member indication information element to "member."

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A computer program comprising machine readable instructions which when executed by a device (an apparatus) control it to perform the method of any one of the above. A method as in any above, further comprising one or more aspects of the exemplary embodiments of the invention as described herein.

(17) In another exemplary embodiment, a program storage device readable by a machine, tangibly embodying a program of instructions executable by the machine for performing operations, said operations comprising: detecting a local network access node (1101); generating a measurement report based on the detected local network access node, where the measurement report is for transmission to a serving network access node (1102); and in response to successfully reading system information for the detected local network access node, including in the generated measurement report information that uniquely identifies the detected local network access node (1103).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(18) In another exemplary embodiment, an apparatus comprising: at least one processor; and at least one memory including computer program code, the at least one memory and the computer program code being configured to, with the at least one processor, cause the apparatus at least to perform: detect a local network access node; generate a measurement report based on the detected local network access node, where the measurement report is for transmission to a serving network access node; and in response to successfully reading system information for the detected local network access node, include in the generated measurement report information that uniquely identifies the detected local network access node.

An apparatus as in any above, embodied in at least one integrated circuit. An apparatus as in any above, further comprising one or more aspects of the exemplary embodiments of the invention as described herein.

(19) In another exemplary embodiment, an apparatus comprising: means for detecting a local network access node;

means for generating a measurement report based on the detected local network access node, where the measurement report is for transmission to a serving network access node; and means for, in response to successfully reading system information for the detected local network access node, including in the generated measurement report information that uniquely identifies the detected local network access node.

An apparatus as in any above, where the means for detecting comprises a measurement unit, the means for generating comprises at least one processor and the means for including comprises at least one processor. An apparatus as in any above, embodied in at least one integrated circuit. An apparatus as in any above, further comprising one or more aspects of the exemplary embodiments of the invention as described herein.

(20) In another exemplary embodiment, an apparatus comprising: detection circuitry configured to detect a local network access node; report generation circuitry configured to generate a measurement report based on the detected local network access node, where the measurement report is for transmission to a serving network access node; and inclusion circuitry configured, in response to successfully reading system information for the detected local network access node, to include in the generated measurement report information that uniquely identifies the detected local network access node.

An apparatus as in any above, embodied in at least one integrated circuit. An apparatus as in any above, further comprising one or more aspects of the exemplary embodiments of the invention as described herein.

Figure 12:
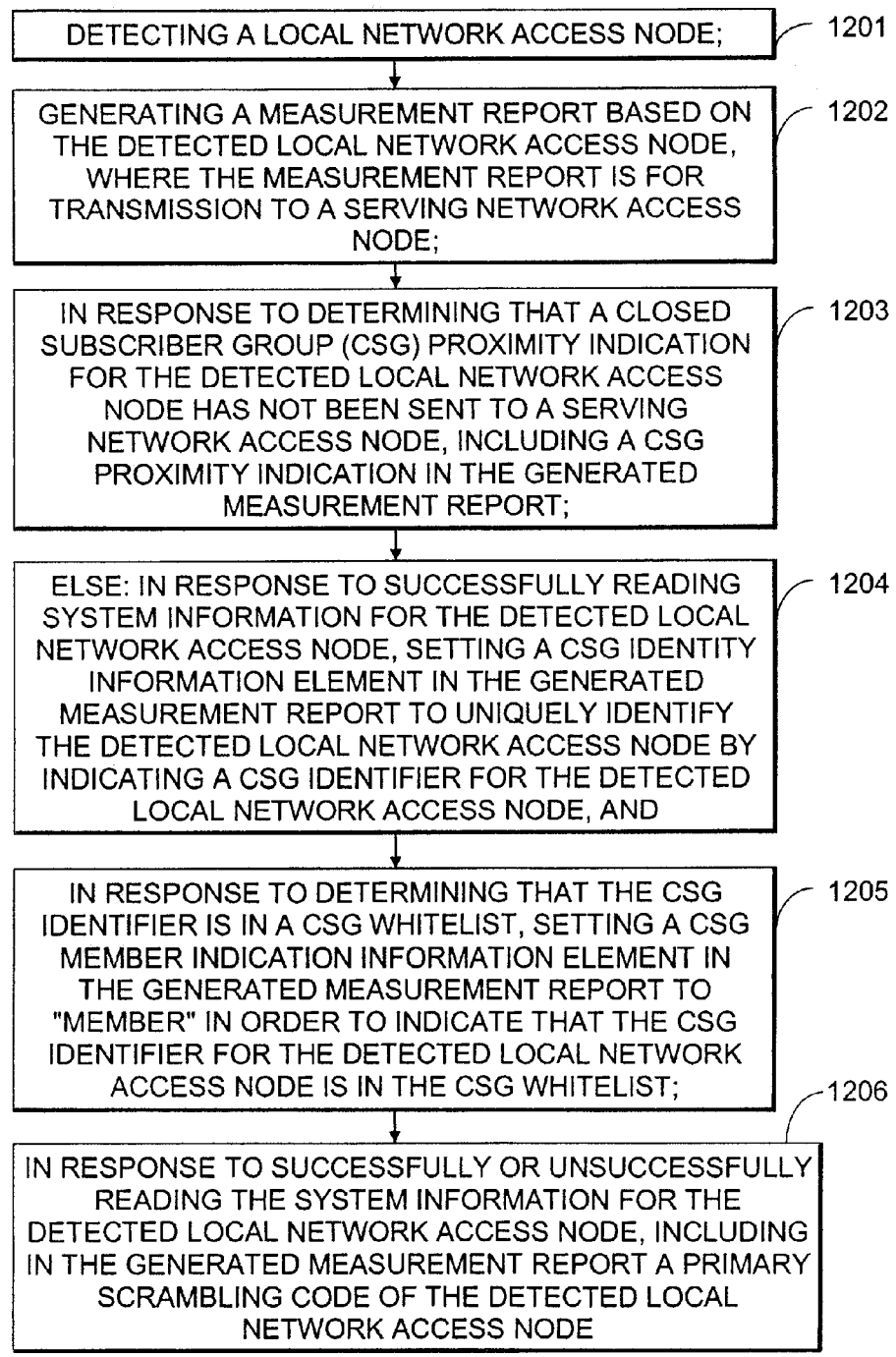

(21) In another exemplary embodiment, and with reference to FIG. 12, a method comprising: detecting a local network access node (1201); generating a measurement report based on the detected local network access node, where the measurement report is for transmission to a serving network access node (1202); in response to determining that a closed subscriber group (CSG) proximity indication for the detected local network access node has not been sent to a serving network access node, including a CSG proximity indication in the generated measurement report (1203); else: in response to successfully reading system information for the detected local network access node, setting a CSG identity information element in the generated measurement report to uniquely identify the detected local network access node by indicating a CSG identifier for the detected local network access node (1204), in response to determining that the CSG identifier is in a CSG whitelist, setting a CSG Member indication information element in the generated measurement report to "member" in order to indicate that the CSG identifier for the detected local network access node is in the CSG whitelist (1205), and in response to successfully or unsuccessfully reading the system information for the detected local network access node (or in response to successfully reading a primary scrambling code for the detected local network access node), including in the generated measurement report a primary scrambling code of the detected local network access node (1206).

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A computer program comprising machine readable instructions which when executed by a device (an apparatus) control it to perform the method of any one of the above. A method as in any above, further comprising one or more aspects of the exemplary embodiments of the invention as described herein.

(22) In another exemplary embodiment, a program storage device readable by a machine, tangibly embodying a program of instructions executable by the machine for performing operations, said operations comprising: detecting a local network access node (1201); generating a measurement report based on the detected local network access node, where the measurement report is for transmission to a serving network access node (1202); in response to determining that a closed subscriber group (CSG) proximity indication for the detected local network access node has not been sent to a serving network access node, including a CSG proximity indication in the generated measurement report (1203); else: in response to successfully reading system information for the detected local network access node, setting a CSG identity information element in the generated measurement report to uniquely identify the detected local network access node by indicating a CSG identifier for the detected local network access node (1204), in response to determining that the CSG identifier is in a CSG whitelist, setting a CSG Member indication information element in the generated measurement report to "member" in order to indicate that the CSG identifier for the detected local network access node is in the CSG whitelist (1205), and in response to successfully or unsuccessfully reading the system information for the detected local network access node (or in response to successfully reading a primary scrambling code for the detected local network access node), including in the generated measurement report a primary scrambling code of the detected local network access node (1206).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(23) In another exemplary embodiment, an apparatus comprising: at least one processor; and at least one memory including computer program code, the at least one memory and the computer program code being configured to, with the at least one processor, cause the apparatus at least to perform: detect a local network access node; generate a measurement report based on the detected local network access node, where the measurement report is for transmission to a serving network access node; in response to determining that a closed subscriber group (CSG) proximity indication for the detected local network access node has not been sent to a/the serving network access node, include a CSG proximity indication in the generated measurement report; else: in response to successfully reading system information for the detected local network access node, set a CSG identity information element in the generated measurement report to uniquely identify the detected local network access node by indicating a CSG identifier for the detected local network access node, in response to determining that the CSG identifier is in a CSG whitelist, set a CSG Member indication information element in the generated measurement report to "member" in order to indicate that the CSG identifier for the detected local network access node is in the CSG whitelist, and in response to successfully or unsuccessfully reading the system information for the detected local network access node (or in response to successfully reading a primary scrambling code for the detected local network access node), include in the generated measurement report a primary scrambling code of the detected local network access node.

An apparatus as in any above, embodied in at least one integrated circuit. An apparatus as in any above, further comprising one or more aspects of the exemplary embodiments of the invention as described herein.

(24) In another exemplary embodiment, an apparatus comprising: means for detecting a local network access node; means for generating a measurement report based on the detected local network access node, where the measurement report is for transmission to a serving network access node; means for, in response to determining that a closed subscriber group (CSG) proximity indication for the detected local network access node has not been sent to a/the serving network access node, including a CSG proximity indication in the generated measurement report; means for, else: in response to successfully reading system information for the detected local network access node, setting a CSG identity information element in the generated measurement report to uniquely identify the detected local network access node by indicating a CSG identifier for the detected local network access node, means for, in response to determining that the CSG identifier is in a CSG whitelist, setting a CSG Member indication information element in the generated measurement report to "member" in order to indicate that the CSG identifier for the detected local network access node is in the CSG whitelist, and means for, in response to successfully or unsuccessfully reading the system information for the detected local network access node (or in response to successfully reading a primary scrambling code for the detected local network access node), including in the generated measurement report a primary scrambling code of the detected local network access node.

An apparatus as above, where the means for detecting comprises a measurement unit, the means for generating, means for including, and means for setting comprise (e.g., collectively or individually) at least one processor. An apparatus as in any above, embodied in at least one integrated circuit. An apparatus as in any above, further comprising one or more aspects of the exemplary embodiments of the invention as described herein.

(25) In another exemplary embodiment, an apparatus comprising: detection circuitry configured to detect a local network access node; report generation circuitry configured to generate a measurement report based on the detected local network access node, where the measurement report is for transmission to a serving network access node; inclusion circuitry configured, in response to determining that a closed subscriber group (CSG) proximity indication for the detected local network access node has not been sent to a/the serving network access node, to include a CSG proximity indication in the generated measurement report; IE setting circuitry configured, else: in response to successfully reading system information for the detected local network access node, to set a CSG identity information element in the generated measurement report to uniquely identify the detected local network access node by indicating a CSG identifier for the detected local network access node, setting circuitry configured, in response to determining that the CSG identifier is in a CSG whitelist, to set a CSG Member indication information element in the generated measurement report to "member" in order to indicate that the CSG identifier for the detected local network access node is in the CSG whitelist, and second inclusion circuitry configured, in response to successfully or unsuccessfully reading the system information for the detected local network access node (or in response to successfully reading a primary scrambling code for the detected local network access node), to include in the generated measurement report a primary scrambling code of the detected local network access node.

An apparatus as in any above, embodied in at least one integrated circuit. An apparatus as in any above, further comprising one or more aspects of the exemplary embodiments of the invention as described herein.

Figure 13:
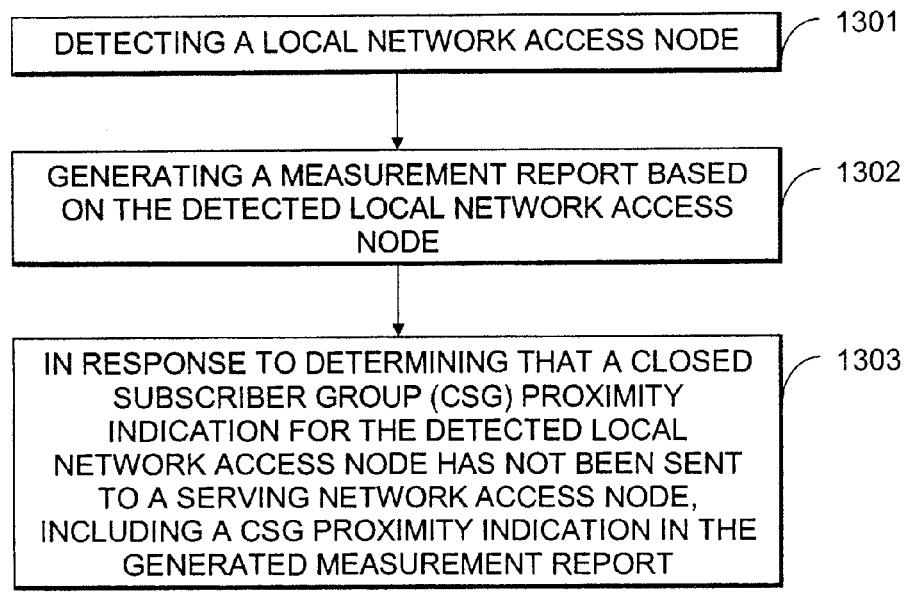

(26) In another exemplary embodiment, and with reference to FIG. 13, a method comprising: detecting a local network access node (1301); generating a measurement report based on the detected local network access node (1302); and in response to determining that a closed subscriber group (CSG) proximity indication for the detected local network access node has not been sent to a serving network access node, including a CSG proximity indication in the generated measurement report (1303).

A method as above, where the CSG proximity indication is included in the generated measurement report further in response to a proximity detection function being enabled for a radio access technology that corresponds to the detected local network access node. A method as in any above, where the CSG proximity indication is included in the generated measurement report further in response to a device being aware that it is in the proximity of at least one cell on a frequency of an enabled radio access technology whose CSG identifier is in a CSG whitelist of the device. A method as in any above, where the generated measurement report further comprises a request for at least one transmission gap to allow for at least one of additional measurement attempts and additional detection attempts.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A computer program comprising machine readable instructions which when executed by a device (an apparatus) control it to perform the method of any one of the above. A method as in any above, further comprising one or more aspects of the exemplary embodiments of the invention as described herein.

(27) In another exemplary embodiment, a program storage device readable by a machine, tangibly embodying a program of instructions executable by the machine for performing operations, said operations comprising: detecting a local network access node (1301); generating a measurement report based on the detected local network access node (1302); and in response to determining that a closed subscriber group (CSG) proximity indication for the detected local network access node has not been sent to a serving network access node, including a CSG proximity indication in the generated measurement report (1303).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(28) In another exemplary embodiment, an apparatus comprising: at least one processor; and at least one memory including computer program code, the at least one memory and the computer program code being configured to, with the at least one processor, cause the apparatus at least to perform: detect a local network access node; generate a measurement report based on the detected local network access node; and in response to determining that a closed subscriber group (CSG) proximity indication for the detected local network access node has not been sent to a serving network access node, include a CSG proximity indication in the generated measurement report.

An apparatus as in any above, embodied in at least one integrated circuit. An apparatus as in any above, further comprising one or more aspects of the exemplary embodiments of the invention as described herein.

(29) In another exemplary embodiment, an apparatus comprising: means for detecting a local network access node; means for generating a measurement report based on the detected local network access node; and means for, in response to determining that a closed subscriber group (CSG) proximity indication for the detected local network access node has not been sent to a serving network access node, including a CSG proximity indication in the generated measurement report.

An apparatus as above, where the means for detecting comprises a measurement component, the means for generating comprises at least one processor and the means for including comprises at least one processor. An apparatus as in any above, embodied in at least one integrated circuit. An apparatus as in any above, further comprising one or more aspects of the exemplary embodiments of the invention as described herein.

(30) In another exemplary embodiment, an apparatus comprising: detection circuitry configured to detect a local network access node; report generation circuitry configured to generate a measurement report based on the detected local network access node; and inclusion circuitry configured, in response to determining that a closed subscriber group (CSG) proximity indication for the detected local network access node has not been sent to a serving network access node, to include a CSG proximity indication in the generated measurement report.

An apparatus as in any above, embodied in at least one integrated circuit. An apparatus as in any above, further comprising one or more aspects of the exemplary embodiments of the invention as described herein.

Figure 15:
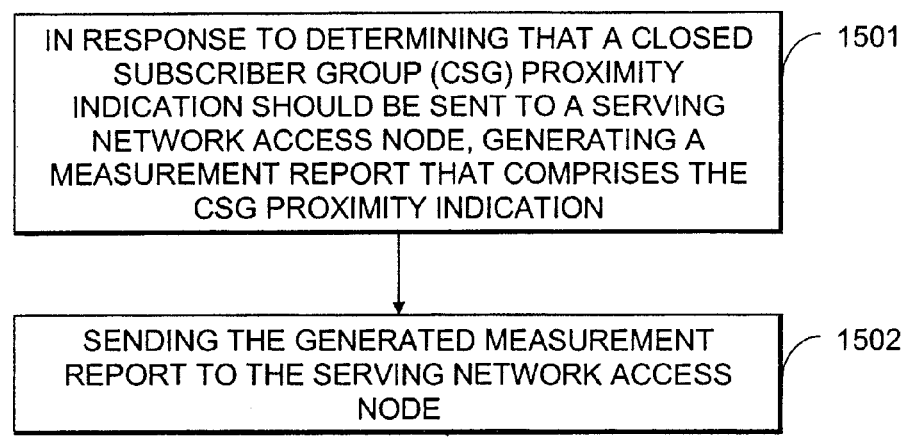

(31) In another exemplary embodiment, and with reference to FIG. 15, a method comprising: in response to determining that a closed subscriber group (CSG) proximity indication should be sent to a serving network access node, generating a measurement report that comprises the CSG proximity indication (1501); and sending the generated measurement report to the serving network access node (1502) (or sending the generated measurement report to a transmission component for transmission to the serving network access node).

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A computer program comprising machine readable instructions which when executed by a device (an apparatus) control it to perform the method of any one of the above. A method as in any above, further comprising one or more aspects of the exemplary embodiments of the invention as described herein.

(32) In another exemplary embodiment, a program storage device readable by a machine, tangibly embodying a program of instructions executable by the machine for performing operations, said operations comprising: in response to determining that a closed subscriber group (CSG) proximity indication should be sent to a serving network access node, generating a measurement report that comprises the CSG proximity indication (1501); and sending the generated measurement report to the serving network access node (1502) (or sending the generated measurement report to a transmission component for transmission to the serving network access node).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(33) In another exemplary embodiment, an apparatus comprising: at least one processor; and at least one memory including computer program code, the at least one memory and the computer program code being configured to, with the at least one processor, cause the apparatus at least to perform: in response to determining that a closed subscriber group (CSG) proximity indication should be sent to a serving network access node, generate a measurement report that comprises the CSG proximity indication; and send the generated measurement report to the serving network access node (or sending the generated measurement report to a transmission component for transmission to the serving network access node).

An apparatus as in any above, embodied in at least one integrated circuit. An apparatus as in any above, further comprising one or more aspects of the exemplary embodiments of the invention as described herein.

(34) In another exemplary embodiment, an apparatus comprising: means for, in response to determining that a closed subscriber group (CSG) proximity indication should be sent to a serving network access node, generating a measurement report that comprises the CSG proximity indication; and means for sending the generated measurement report to the serving network access node (or for sending the generated measurement report to a transmission component for transmission to the serving network access node).

An apparatus as above, where the means for generating comprises at least one processor and the means for sending comprises at least one transistor. An apparatus as in any above, embodied in at least one integrated circuit. An apparatus as in any above, further comprising one or more aspects of the exemplary embodiments of the invention as described herein.

(35) In another exemplary embodiment, an apparatus comprising: report generation circuitry configured, in response to determining that a closed subscriber group (CSG) proximity indication should be sent to a serving network access node, to generate a measurement report that comprises the CSG proximity indication; and transmission circuitry configured to send the generated measurement report to the serving network access node (or to send the generated measurement report to a transmission component for transmission to the serving network access node).

An apparatus as in any above, embodied in at least one integrated circuit. An apparatus as in any above, further comprising one or more aspects of the exemplary embodiments of the invention as described herein.

(36) In another exemplary embodiment, a method comprising: generating a measurement report for transmission to a serving network access node; and in response to a proximity detection function being enabled for a radio access technology, including a closed subscriber group (CSG) proximity indication in the generated measurement report.

A method as above, where the CSG proximity indication is included in the generated measurement report in response to a mobile device being aware that it is in proximity of one or more cells on a frequency of the enabled radio access technology whose CSG IDs are in a CSG whitelist of the mobile device. A method as in any above, where the CSG proximity indication is included in the generated measurement report in response to the mobile device not previously transmitting a CSG proximity indication for the radio access technology and frequency since the enabling of the proximity detection function. A method as in any above, where the CSG proximity indication is included in the generated measurement report in response to a last CSG proximity indication transmitted for the enabled radio access technology and frequency having been a leaving indication and more than a certain amount of time (e.g., 5 seconds) having elapsed since transmission of the last CSG proximity indication. A method as in any above, where the measurement report further comprises a frequency of the one or more cells for which the CSG proximity indication was triggered. A method as in any above, where the CSG proximity indication comprises an entering indication.

A method as in any above, where the CSG proximity indication is included in the generated measurement report in response to a mobile device leaving proximity of all the cells on a frequency of an enabled radio access technology whose CSG IDs are in a whitelist of the mobile device. A method as in any above, where the CSG proximity indication is included in the generated measurement report in response to a last CSG proximity indication transmitted for the enabled radio access technology and frequency having been an entering indication and more than a certain amount of time (e.g., 5 seconds) having elapsed since transmission of the last CSG proximity indication. A method as in any above, where the CSG proximity indication comprises a leaving indication. A method as in any above, where the measurement report further comprises a frequency of the one or more cells for which the CSG proximity indication was triggered. A method as in any above, further comprising sending (e.g., transmitting) the generated measurement report (e.g., from a mobile device to a serving network access node).

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A computer program comprising machine readable instructions which when executed by a device (an apparatus) control it to perform the method of any one of the above. A method as in any above, further comprising one or more aspects of the exemplary embodiments of the invention as described herein.

(37) In another exemplary embodiment, a program storage device readable by a machine, tangibly embodying a program of instructions executable by the machine for performing operations, said operations comprising: generating a measurement report for transmission to a serving network access node; and in response to a proximity detection function being enabled for a radio access technology, including a closed subscriber group (CSG) proximity indication in the generated measurement report.

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(38) In another exemplary embodiment, an apparatus comprising: at least one processor; and at least one memory including computer program code, the at least one memory and the computer program code being configured to, with the at least one processor, cause the apparatus at least to perform: generate a measurement report for transmission to a serving network access node; and in response to a proximity detection function being enabled for a radio access technology, include a closed subscriber group (CSG) proximity indication in the generated measurement report.

An apparatus as in any above, embodied in at least one integrated circuit. An apparatus as in any above, further comprising one or more aspects of the exemplary embodiments of the invention as described herein.

(39) In another exemplary embodiment, an apparatus comprising: means for generating a measurement report for transmission to a serving network access node; and means for, in response to a proximity detection function being enabled for a radio access technology, including a closed subscriber group (CSG) proximity indication in the generated measurement report.

An apparatus as in any above, where the means for generating and the means for including comprise at least one processor. An apparatus as in any above, further comprising means for sending (e.g., at least one transmitter) the generated measurement report (e.g., from a mobile node/the apparatus to a serving network access node). An apparatus as in any above, further comprising one or more aspects of the exemplary embodiments of the invention as described herein.

(40) In another exemplary embodiment, an apparatus comprising: report generation circuitry configured to generate a measurement report for transmission to a serving network access node; and inclusion circuitry configured, in response to a proximity detection function being enabled for a radio access technology, to include a closed subscriber group (CSG) proximity indication in the generated measurement report.

An apparatus as in any above, embodied in at least one integrated circuit. An apparatus as in any above, further comprising one or more aspects of the exemplary embodiments of the invention as described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

Still further, the various names used for various parameters and information elements are not intended to be limiting in any respect, as these items may be identified by any suitable names.

The various blocks shown in FIGS. 4, 5 and 8-15 may be viewed as method steps, as operations that result from operation of computer program code and/or as one or more coupled components (e.g., function blocks, circuits, integrated circuits, logic circuit elements) constructed to carry out the associated function(s). The blocks depicted in FIGS. 4, 5 and 8-15 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 4, 5 and 8-15 should be considered merely exemplary and non-limiting. It should be appreciated that the blocks depicted in FIGS. 4, 5 and 8-15 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 4, 5 and 8-15 so as to implement one or more further exemplary embodiments of the invention, such as those described in further detail herein.

That is, the non-limiting, exemplary embodiments of the invention shown in FIGS. 4, 5 and 8-15 may be implemented, practiced or utilized in conjunction with one or more further aspects in any combination (e.g., any combination that is practicable, suitable and/or feasible) and are not limited only to the blocks, steps, functions and/or operations illustrated in FIGS. 4, 5 and 8-15.

It should be understood that any and all references herein to a macro network access node, a macro BS and/or a macro network node may be seen to correspond to a "serving network access node," and vice versa. Furthermore, while described above in relation to a macro or cellular network access node, in other exemplary embodiments the serving network access node may be embodied as a different entity, such as, for example, a relay node or a mobile router.

While described above in reference to the generation and/or transmission of a measurement report, in some exemplary embodiments the proximity indication/report is sent on its own without a PSC or Cell 1D/CSG ID. As an example, this would indicate that the UE "might be somewhere near" a/the cell (CSG). In some exemplary embodiments, the proximity indication is sent before actual detection of the cell, for example, to allow for the relevant measurements to be set up in advance (e.g., commands sent and received). In other exemplary embodiments, the measurement report may include both the proximity indication and the PSC of a detected cell/CSG (e.g., with or without a Cell ID/CSG ID or CSG Member IE). In further exemplary embodiments, any suitable combination of the proximity indication, PSC, CSG ID, Cell ID and CSG Member IE may be included in a message, such as a measurement report. In some exemplary embodiments, a Cell ID, CSG ID and/or CSG Member IE are not included without a PSC for the same cell/CSG.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit(s), where the integrated circuit(s) may comprise circuitry (as well as possibly firmware) for embodying at least one or more of a data processor(s), a digital signal processor(s), baseband circuitry and radio frequency circuitry that are configurable so as to operate in accordance with the exemplary embodiments of this invention.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

For example, while the exemplary embodiments have been described above in the context of various systems (e.g., E-UTRAN, UMTS), it should be appreciated that the exemplary embodiments of this invention are not limited for use with only these particular types of wireless communication systems, and that they may be used to advantage in other wireless communication systems.

Further by example, while the level of confidence has been described as being one of three levels (high, medium, low), in other embodiments the number of levels may be more or less than three, while in other embodiments the levels may be but two (e.g., high/not high). This latter condition may be advantageously indicated to the macro network access node 10 by the use of but a single signaling bit, for example.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   detecting, by a mobile terminal, a local network access node;
   generating a measurement report based on the detected local network access node, where the measurement report is for transmission to a serving network access node; and
   in response to successfully reading system information for the detected local network access node, including in the generated measurement report information that uniquely identifies the detected local network access node, where the information comprises a closed subscriber group identifier for the detected local network access node, and where in response to determining that the closed subscriber group identifier is in a closed subscriber group whitelist, including closed subscriber group member information in the generated measurement report, where an information element comprising a closed subscriber group member indication information element of the closed subscriber group member information is set to "member" to indicate that the closed subscriber group identifier for the detected local network access node is in the closed subscriber group whitelist.

2. The method of claim 1, further comprising: in response to successfully or unsuccessfully reading the system information for the detected local network access node, including in the generated measurement report a primary scrambling code of the detected local network access node.

3. The method of claim 1, further comprising: in response to determining that a closed subscriber group proximity indication has not been sent to a serving network access node, including a closed subscriber group proximity indication in the generated measurement report.

4. The method of claim 1, where including the information in the generated measurement report comprises setting an information element in the generated measurement report to uniquely identify the detected local network access node.

5. The method of claim 1, comprising the closed group subscriber identifier is received in a broadcast from the local network access node, where the determining that the closed subscriber group identifier is in the closed subscriber group whitelist is in response to the broadcast.

6. The method of claim 1, where including the closed subscriber group member information in the generated measurement report comprises setting an information element in the generated measurement report.

7. A method comprising:
   detecting a local network access node;
   generating a measurement report based on the detected local network access node, where the measurement report is for transmission to a serving network access node;
   in response to determining that a closed subscriber group proximity indication for the detected local network access node has not been sent to a serving network access node, including a closed subscriber group proximity indication in the generated measurement report;
   else:
   in response to successfully reading system information for the detected local network access node, setting a closed subscriber group identity information element in the generated measurement report to uniquely identify the detected local network access node by indicating a closed subscriber group identifier for the detected local network access node,
   in response to determining that the closed subscriber group identifier is in a closed subscriber group whitelist, setting a closed subscriber group member indication information element in the generated measurement report to "member" in order to indicate that the closed subscriber group identifier for the detected local network access node is in the closed subscriber group whitelist, and
   in response to successfully or unsuccessfully reading the system information for the detected local network access node, including in the generated measurement report a primary scrambling code of the detected local network access node.

8. An apparatus comprising:
   at least one processor; and
   at least one memory including computer program code, the at least one memory and the computer program code being configured to, with the at least one processor, cause the apparatus at least:
   detect a local network access node;
   generate a measurement report based on the detected local network access node, where the measurement report is for transmission to a serving network access node; and
   in response to successfully reading system information for the detected local network access node, include in the generated measurement report information that uniquely identifies the detected local network access node, where the information comprises a closed subscriber group identifier for the detected local network access node, and where in response to determining that the closed subscriber group identifier is in a closed subscriber group whitelist, including closed subscriber group member information in the generated measurement report, where an information element comprising a closed subscriber group member indication information element of the closed subscriber group member information is set to "member" to indicate that the closed subscriber group identifier for the detected local network access node is in the closed subscriber group whitelist.

9. The apparatus of claim 8, where the at least one memory and the computer program code are configured to, with the at least one processor, cause the apparatus to further perform: in response to successfully or unsuccessfully reading the system information for the detected local network access node, include in the generated measurement report a primary scrambling code of the detected local network access node.

10. The apparatus of claim 8, where the at least one memory and the computer program code are configured to, with the at least one processor, cause the apparatus to further perform: in response to determining that a closed subscriber group proximity indication has not been sent to a serving network access node, include a closed subscriber group proximity indication in the generated measurement report.

11. The apparatus of claim 8, where the memory including the computer program code is configured with the at least one processor to cause the apparatus to receive the closed group subscriber identifier in a broadcast from the local network access node, where the determining that the closed subscriber group identifier is in the closed subscriber group whitelist is in response to the broadcast.

12. The apparatus of claim 8, where the at least one memory including the computer program code is configured with the at least one processor to cause the apparatus to, in response to determining that a closed subscriber group proximity indication has not been sent to a serving network access node, include a closed subscriber group proximity indication in the generated measurement report.

13. The apparatus of claim 8, where the apparatus comprises a portable electronic device or a mobile phone.

14. A non-transitory computer readable medium encoded with a computer program executable by a processor to perform actions comprising:

detecting a local network access node;

generating a measurement report based on the detected local network access node, where the measurement report is for transmission to a serving network access node; and in response to successfully reading system information for the detected local network access node, including in the generated measurement report information that uniquely identifies the detected local network access node, where the information comprises a closed subscriber group identifier for the detected local network access node, and where in response to determining that the closed subscriber group identifier is in a closed subscriber group whitelist, including closed subscriber group member information in the generated measurement report, where an information element comprising a closed subscriber group member indication information element of the closed subscriber group member information is set to "member" to indicate that the closed subscriber group identifier for the detected local network access node is in the closed subscriber group whitelist.

15. The non-transitory computer readable medium of claim 14, further comprising: in response to successfully or unsuccessfully reading the system information for the detected local network access node, including in the generated measurement report a primary scrambling code of the detected local network access node.

16. The non-transitory computer readable medium of claim 14, comprising the closed group subscriber identifier is received in a broadcast from the local network access node, where the determining that the closed subscriber group identifier is in the closed subscriber group whitelist is in response to the broadcast.

* * * * *